United States Patent
Morimoto et al.

(10) Patent No.: US 8,727,924 B2
(45) Date of Patent: May 20, 2014

(54) DRIVE FORCE OUTPUT APPARATUS AND VEHICLE HAVING THE SAME

(75) Inventors: Youhei Morimoto, Kariya (JP); Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 111 days.

(21) Appl. No.: 13/337,559

(22) Filed: Dec. 27, 2011

(65) Prior Publication Data
US 2012/0165149 A1    Jun. 28, 2012

(30) Foreign Application Priority Data

Dec. 27, 2010  (JP) ................................ 2010-289275
Oct. 17, 2011  (JP) ................................ 2011-227615

(51) Int. Cl.
*F16H 3/72*    (2006.01)

(52) U.S. Cl.
USPC ............... 475/5; 475/149; 475/151; 475/153; 477/3

(58) Field of Classification Search
USPC ........................... 475/5, 149, 151, 153; 477/3
See application file for complete search history.

(56) References Cited

FOREIGN PATENT DOCUMENTS

| JP | 7-135701 | 5/1995 |
|----|----------|--------|
| JP | 2002-281607 | 9/2002 |
| JP | P2006-77859 A | 3/2006 |

OTHER PUBLICATIONS

Japanese Office Action dated Aug. 29, 2012, issued in corresponding Japanese Application No. 2011-227615 with English translation.

*Primary Examiner* — Derek D Knight
(74) *Attorney, Agent, or Firm* — Nixon & Vanderhye P.C.

(57) ABSTRACT

Planetary ratios of first and second planetary gear mechanisms are set such that all of the following values become equal to each other: a maximum value of a drive force of a first MG, which is generated when a total input-to-output speed ratio is a minimum value upon operation of the first MG as a motor; a maximum value of a drive force of the first MG, which is generated when the total input-to-output speed ratio is a maximum value upon operation of the first MG as the motor; and a maximum value of a drive force of the first MG, which is generated when the total input-to-output speed ratio is in a range from the minimum value to the maximum value upon operation of the first MG as a generator.

14 Claims, 14 Drawing Sheets

DRIVE FORCE OUTPUT APPARATUS AND VEHICLE HAVING THE SAME

CROSS REFERENCE TO RELATED APPLICATION

This application is based on and incorporates herein by reference Japanese Patent Application No. 2010-289275 filed on Dec. 27, 2010 and Japanese Patent Application No. 2011-227615 filed on Oct. 17, 2011.

BACKGROUND OF THE INVENTION

1. Field of the Invention

The present invention relates to a drive force output apparatus and a vehicle having the same.

2. Description of Related Art

Lately, there is a growing market demand for hybrid vehicles (hybrid automobiles) because of the low fuel consumption, the low exhaust emissions and the like of the hybrid vehicles. For instance, as recited in Japanese Unexamined Patent Publication JP H07-135701A, a known hybrid vehicle has an internal combustion engine and two motor generators (hereinafter, the term of "motor generator" will be abbreviated as MG) A drive force of the internal combustion engine is split into two lines through a planetary gear mechanism. An output of one of the two lines is used to drive a drive axle of the vehicle and thereby to drive wheels of the vehicle. An output of the other one of the two lines is used to drive the first MG and thereby to generate electric power. The electric power generated by the first MG and/or the electric power of a battery may be used to drive the second MG, and the drive force of the second MG may be used to drive the wheels. In this way, the internal combustion engine may be driven in an efficient torque range, and at the same time, a change in the rotational speed is enabled.

However, when the system (the system, which splits the drive force through the one planetary gear mechanism) of Japanese Unexamined Patent Publication JP H07-135701A is applied to a vehicle having the internal combustion engine of a large displacement, the drive forces, which are handled by the two MGs, are increased. Therefore, the sizes of the electric components, such as the MGs and inverters, are increased to cause a difficulty in installation of the system on the vehicle. Furthermore, the electric loss is increased, and thereby the fuel consumption is deteriorated by the amount, which corresponds to the electric loss.

SUMMARY OF THE INVENTION

Thus, it is an objective of the present invention to provide a drive force output apparatus for a vehicle, which enables a reduction in a drive force handled by motor generators and a reduction in a size of an electric component of the drive force output apparatus and also enables an improvement in fuel consumption of the vehicle. It is another objective of the present invention to provide a vehicle having such a drive force output apparatus.

According to the present invention, there is provided a drive force output apparatus for a vehicle. The drive force output apparatus includes a drive source, at least two motor generators, a drive force transmission device, an electric power source and control means. The drive source outputs a drive force. The at least two motor generators include a first motor generator and a second motor generator. The drive force transmission device has at least two planetary gear mechanisms, which include a first planetary gear mechanism and a second planetary gear mechanism. The electric power source is adapted to supply an electric power to or receive an electric power from the first motor generator and the second motor generator. The control means is for controlling the drive source, the first motor generator and the second motor generator. A drive force input shaft is connected to an output shaft of the drive source to conduct a drive force between the drive force input shaft and the output shaft of the drive source. A drive force output shaft is connected to a wheel of the vehicle to conduct a drive force between the drive force output shaft and the wheel of the vehicle. The drive force input shaft, a rotatable shaft of the first motor generator, a rotatable shaft of the second motor generator and the drive force output shaft are connected with each other through the drive force transmission device to conduct a drive force therebetween. A planetary ratio of the first planetary gear mechanism and a planetary ratio of the second planetary gear mechanism are set such that all of the following values (I)-(III) become equal to each other: (I) a maximum value of a drive force of the first motor generator, which is generated when a total input-to-output speed ratio between a rotational speed of the drive force input shaft and a rotational speed of the drive force output shaft is a first predetermined value upon operation of the first motor generator as an electric motor; (II) a maximum value of a drive force of the first motor generator, which is generated when the total input-to-output speed ratio is a second predetermined value that is larger than the first predetermined value upon operation of the first motor generator as the electric motor; and (III) a maximum value of a drive force of the first motor generator, which is generated when the total input-to-output speed ratio is in a range from the first predetermined value to the second predetermined value upon operation of the first motor generator as an electric generator. The control means controls the first motor generator and the second motor generator according to a demanded output of the drive force output shaft. According to the present invention, there is also provided a vehicle including the drive force output apparatus.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
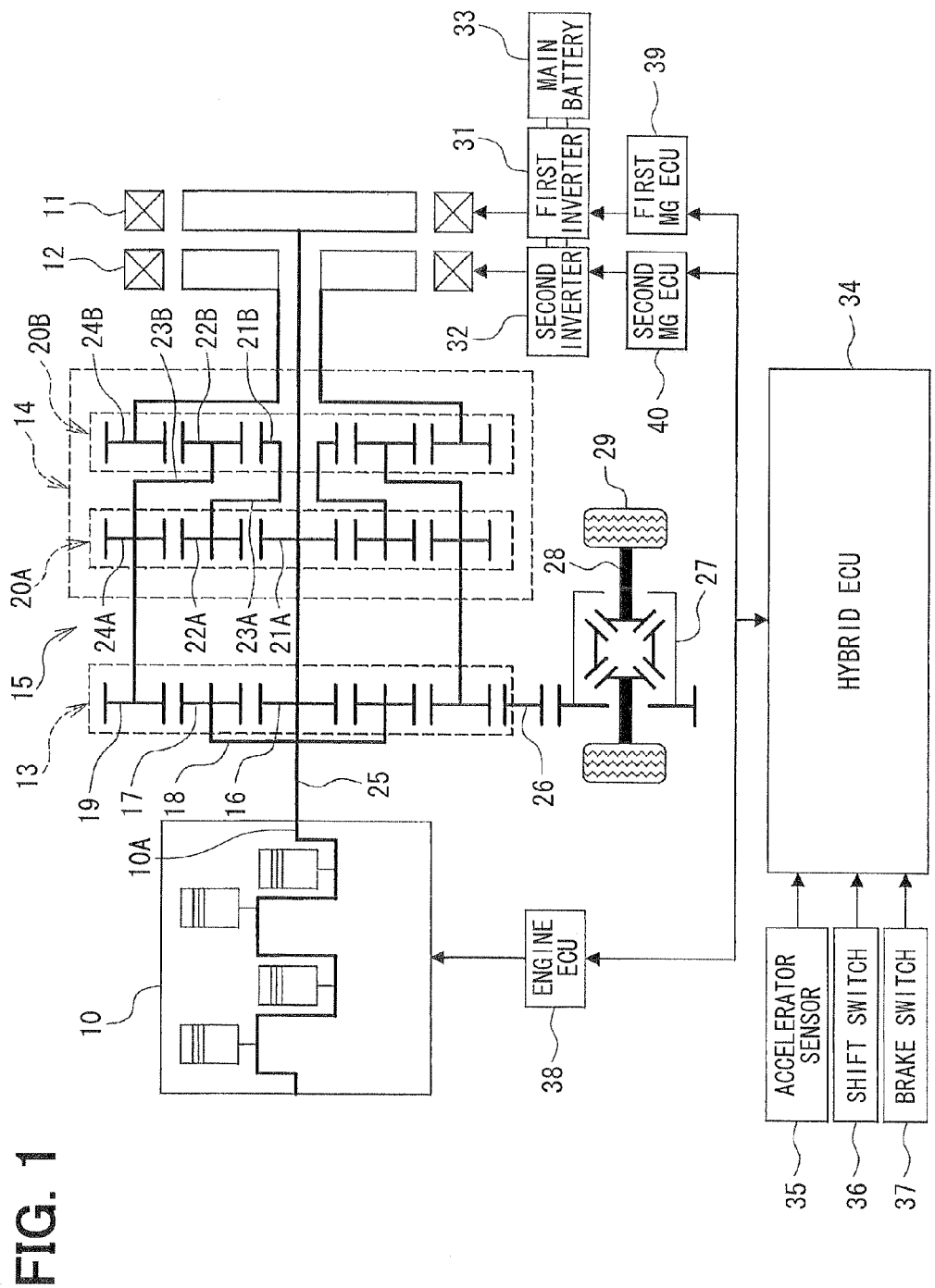
FIG. 1 is a schematic diagram showing a structure of a drive system of a vehicle according to a first embodiment of the present invention.

Various embodiments of the present invention will be described with reference to the accompanying drawings.
First Embodiment A first embodiment of he present invention will be described with reference to FIGS. 1 to 10.

First, an entire structure of a drive system (drive force output apparatus) of a vehicle (more specifically, an automobile) of the present embodiment will be described with reference to FIG. 1.

An internal combustion engine (serving as a drive source) 10, a first motor generator (hereinafter referred to as a first MG) 11, a second motor generator (hereinafter referred to as a second MG) 12 and a drive force transmission device 15 are installed to the vehicle. The drive force transmission device 15 includes a first planetary gear unit (also referred to as a first planetary gear mechanism) 13 and a second planetary gear unit (also referred to as a second planetary gear mechanism) 14. The first MG 11 is mainly used as an electric generator (also referred to as a power generator) but is also used as an electric motor. In contrast, the second MG 12 is mainly used as an electric motor but is also used as an electric generator (also referred to as a power generator).

The first planetary gear unit 13 includes a sun gear 16, planetary gears 17, a planetary carrier 18 and a ring gear 19. The sun gear 16 rotates about a central axis thereof. Each of the planetary gears 17 rotates about a central axis thereof and revolves around the sun gear 16. The planetary carrier 18 rotates integrally with the planetary gears 17. The ring gear 19 is placed on a radially outer side of the planetary gears 17 and rotates around the planetary gears 17.

The second planetary gear unit 14 is formed as a compounded planetary gear mechanism, which includes a planetary gear mechanism 20A (also referred to as a first planetary gear set) and a planetary gear mechanism 20B (also referred to as a second planetary gear set). Each of the planetary gear mechanisms 20A, 20B includes a sun gear 21A, 21B, planetary gears 22A, 22B, a planetary carrier 23A, 23B and a ring gear 24A, 24B. The sun gear 21A, 21B rotates about a central axis thereof. Each of the planetary gears 22A, 22B rotates about a central axis thereof and revolves around the sun gear 21A, 21B. The planetary carrier 23A, 23B rotates integrally with the planetary gears 22A, 22B. The ring gear 24A, 24B is placed on a radially outer side of the planetary gears 22A, 22B and rotates around the planetary gears 22A, 22B.

In the second planetary gear unit 14, the planetary carrier 23A of the planetary gear mechanism 20A and the sun gear 21B of the planetary gear mechanism 20B are connected with each other in a manner that enables conduction of a drive force therebetween (i.e., are connected with each other to conduct the drive force therebetween), and the ring gear 24A of the planetary gear mechanism 20A and the planetary carrier 23B of the planetary gear mechanism 20B are connected with each other in a manner that enables conduction of a drive force therebetween (i.e., are connected with each other to conduct the drive force therebetween). In the following description, the sun gear 21A of the planetary gear mechanism 20A will be also referred to as a sun gear of the second planetary gear unit 14, and the ring gear 24A of the planetary gear mechanism 20A will be also referred to as a planetary carrier of the second planetary gear unit 14. Also, the ring gear 24B of the planetary gear mechanism 20B will be also referred to as a ring gear of the second planetary gear unit 14.

A drive force input shaft 25 of the drive force transmission device 15 is connected to an output shaft (crankshaft) 10A of the engine 10 in a manner that enables conduction of a drive force therebetween (i.e., is connected to the output shaft 10A of the engine 10 to conduct the drive force therebetween). The drive force input shaft 25 and the planetary carrier 18 of the first planetary gear unit 13 are connected with each other in a manner that enables transmission of a drive force therebetween (i.e., are connected with each other to conduct the drive force therebetween). The sun gear 16 of the first planetary gear unit 13, the sun gear of the second planetary gear unit 14 (the sun gear 21A of the planetary gear mechanism 20A), and a rotatable shaft 11A of the first MG 11 are connected with each other in a manner that enables conduction of a drive force therebetween (i.e., are connected with each other to conduct the drive force therebetween). Furthermore, the ring gear 19 of the first planetary gear unit 13, the planetary carrier of the second planetary gear unit 14 (the ring gear 24A of the planetary gear mechanism 20A) and a drive force output shaft 26 of the drive force transmission device 15 are connected with each other in a manner that enables conduction of a drive force therebetween (i.e., are connected with each other to conduct the drive force therebetween). Also, the ring gear of the second planetary gear unit 14 (the ring gear 24B of the planetary gear mechanism 20B) and a rotatable shaft 12A of the second MG 12 are connected with each other in a manner that enables conduction of a drive force therebetween (i.e., are connected with each other to conduct the drive force therebetween). The drive force of the drive force output shaft 26 is conducted to wheels 29 of the vehicle through a differential gear mechanism 27 and an axle 28.

Figure 18:
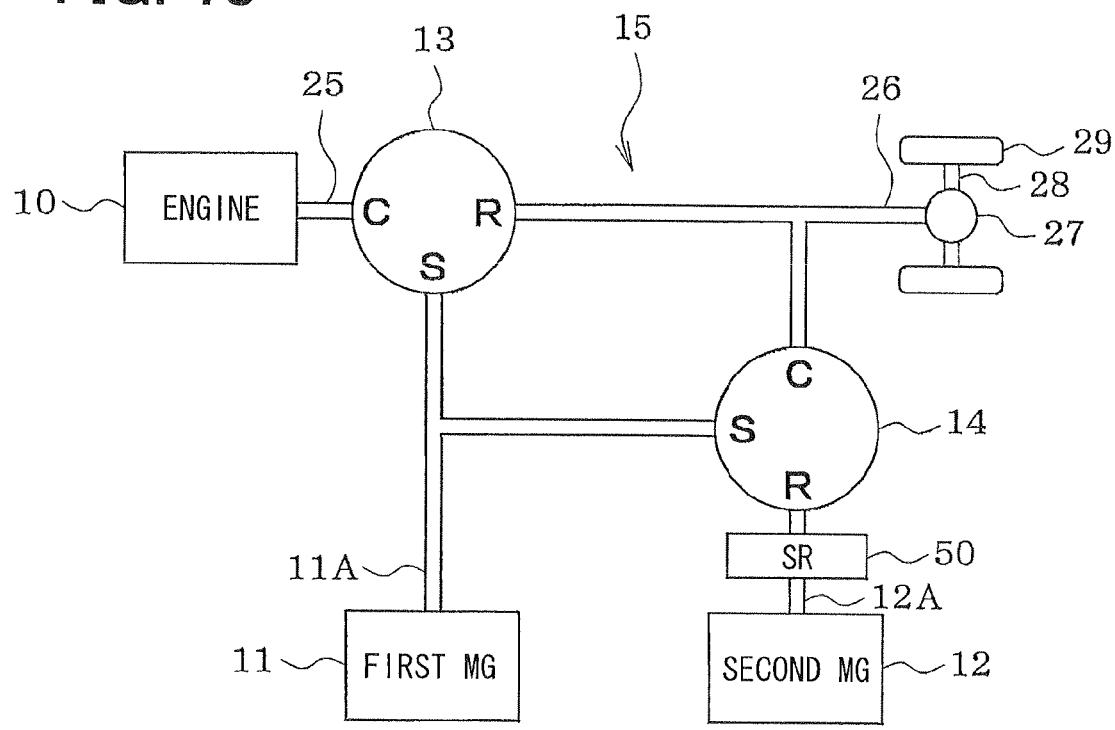
FIG. 18 is a schematic diagram showing a modification of the first embodiment.

Here, it should be noted that a speed reducing mechanism (abbreviated as SR) 50 may be placed between the ring gear of the second planetary gear unit 14 (the ring gear 24B of the planetary gear mechanism 20B) and the rotatable shaft 12A of the second MG 12, as shown in FIG. 18. The speed reducing mechanism 50 may be a speed reducing gear mechanism. In this way, it is possible to reduce a demanded torque (also referred to as a torque demand), which is demanded to the second MG 12, and it is possible to reduce a size and costs of the second MG 12.

Furthermore, a first inverter 31, which drives the first MG 11, and a second inverter 32, which drives the second MG 12, are provided. The first MG 11 and the second MG 12 are connected to a main battery (electric power source) 33 through the inverters 31, 32, respectively, to supply the electric power to or to receive the electric power from the main battery 33. Furthermore, the first MG 11 and the second MG 12 are connected with each other to supply or receive the electric power therebetween through the inverters 31, 32.

A hybrid ECU 34 (serving as control means) is a computer, which controls the entire vehicle. The hybrid ECU 34 receives output signals from various sensors and switches, such as an accelerator sensor 35, a shift switch 36 and a brake switch 37, to sense the driving state of the vehicle. The accelerator sensor 35 senses an accelerator opening degree (amount of depression of an accelerator pedal). The shift switch 36 senses an operational position of a shift lever. The brake switch 37 senses activation of a brake. The hybrid ECU 34 transmits and receives control signals and data signals relative to an engine ECU 38, a first MG ECU 39 and a second MG ECU 40. The engine ECU 38 controls operation of the engine 10. The first MG ECU 39 controls the first inverter 31 to control the first MG 11. The second MG ECU 40 controls the second inverter 32 to control the second MG 12. The engine ECU 38, the first MG ECU 39 and the second MG ECU 40 control the engine 10, the first MG 11 and the second MG 12, respectively, based on the driving state (driving condition) of the vehicle.

Figure 3:
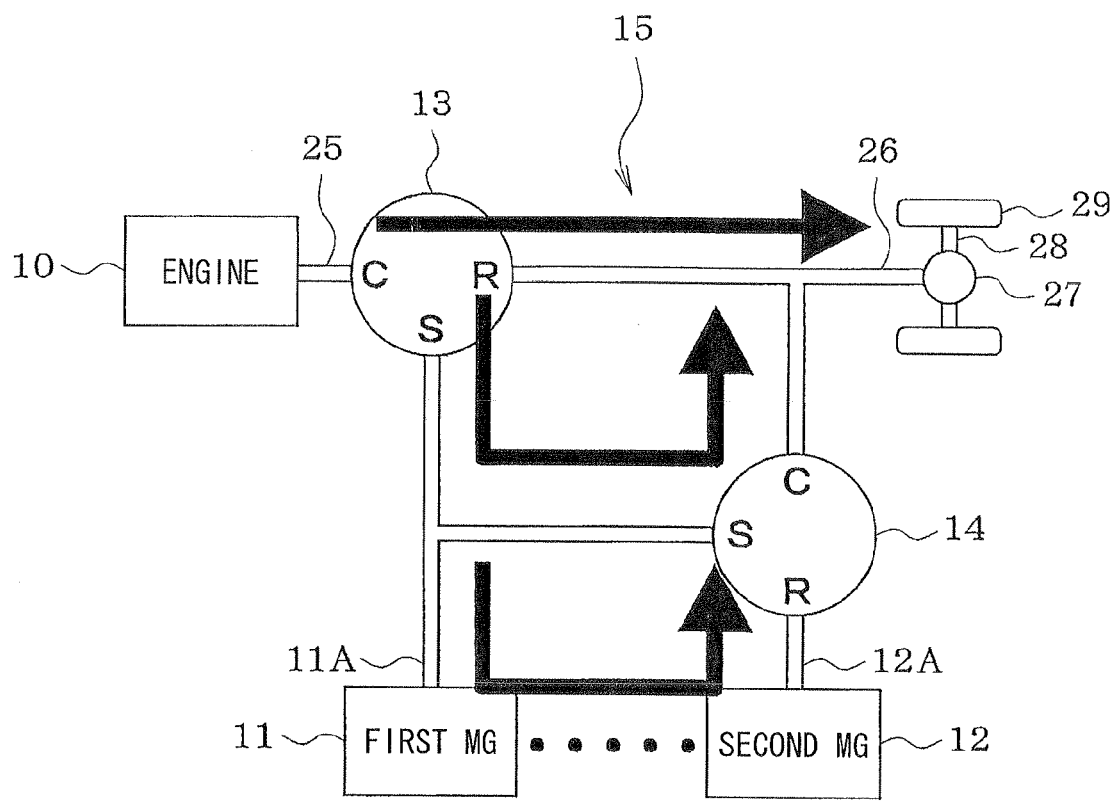
FIG. 3 is a diagram showing a state, in which a drive force of the engine is split in two stages according to the first embodiment.

The above point will be described with reference to FIG. 3, in which each planetary carrier, each ring gear and each sun gear of each planetary gear unit 13, 14 are abbreviated as C, R and S, respectively, for the sake of easy understanding. As shown in FIG. 3, for example, at the time of driving the vehicle in a normal driving state (normal driving condition), the drive force of the engine 10 is divided, i.e., is split and is conducted to two lines, i.e., to the rotatable shaft of the ring gear 19 and the rotatable shaft of the sun gear 16 through the first planetary gear unit 13, and the drive force of the rotatable shaft of the sun gear 16 of the first planetary gear unit 13 is divided, i.e., is split and is conducted to the rotatable shaft of the sun gear (the sun gear 21A of the planetary gear mechanism 20A) of the second planetary gear unit 14 and the first MG 11. In this way, the first MG 11 is driven to generate the electric power. Then, the generated electric power of the first MG 11 is used to drive the second MG 12, and the drive force of the second MG 12 is conducted to the rotatable shaft of the ring gear of the second planetary gear unit 14 (the ring gear 24B of the planetary gear mechanism 20B). Then, the drive force of the rotatable shaft of the ring gear 19 of the first planetary gear unit 13 and the drive force of the rotatable shaft of the planetary carrier of the second planetary gear unit 14 (the ring gear 24A of the planetary gear mechanism 20A) are both conducted to the drive force output shaft 26, so that the drive force output shaft 26 is driven to drive the wheels 29. Furthermore, at the time of rapid acceleration of the vehicle, the electric power is supplied from the main battery 33 to the second MG 12 in addition to the electric power generated at the first MG 11, so that the electric power supplied to the second MG 12 for driving the same is increased.

At the time of the rapid acceleration of the vehicle or at the time of a low load driving state of the vehicle (an operational range of the engine 10, in which a fuel efficiency is low), the engine 10 is maintained in an engine stop state, and the first MG 11 and the second MG 12 are driven with the electric power supplied from the main battery 33 to drive the wheels 29 with the drive forces of the first MG 11 and the second MG 12, so that the vehicle is driven in a motor drive mode (a drive mode for driving the vehicle only with the electric motor power). At the time of decelerating the vehicle, the second MG 12 is driven with the drive force of the wheels 29, and thereby the second MG 12 is operated as the electric generator. Thus, the kinetic energy of the vehicle is converted into the electric power through the second MG 12, and the thus generated electric power is stored in the main battery 33. In this way, the kinetic energy of the vehicle is recovered.

Figure 2:
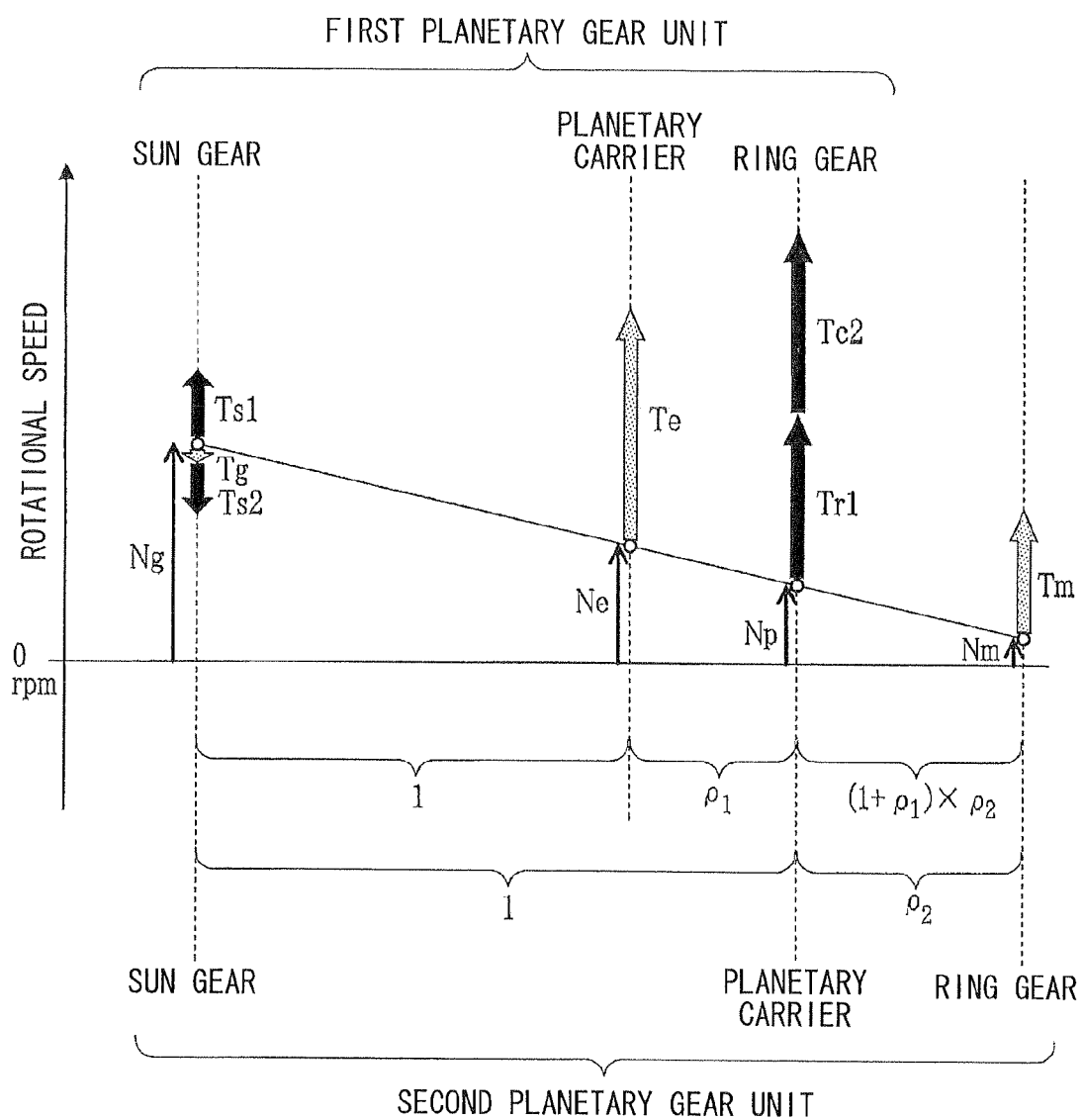
FIG. 2 is a diagram showing an alignment chart, which indicates a relationship among rotational speeds of components of the drive system of the vehicle.

FIG. 2 is a diagram showing an alignment chart, which indicates a relationship among a rotational speed Ne of the engine 10, which is connected to the planetary carrier 18 of the first planetary gear unit 13, a rotational speed Ng of the first MG 11, which is connected to the sun gear 16 of the first planetary gear unit 13 and the sun gear of the second planetary gear unit 14, a rotational speed Np of the drive force output shaft 26, which is connected to the ring gear 19 of the first planetary gear unit 13 and the planetary carrier of the second planetary gear unit 14, and a rotational speed Nm of the second MG 12, which is connected to the ring gear of the second planetary gear unit 14. There is a relationship of that these rotational speeds Ne, Ng, Np, Nm are connected by a straight line in FIG. 2.

A torque Te of the engine 10 is divided, i.e., is split and is conducted to the rotatable shaft of the sun gear 16 and the rotatable shaft of the ring gear 19 through the first planetary gear unit 13. Therefore, a torque Ts1 of the rotatable shaft of the sun gear 16 of the first planetary gear unit 13 and a torque Tr1 of the rotatable shaft of the ring gear 19 of the first planetary gear unit 13 can be expressed by the following equations (1) and (2), respectively, by using the torque Te of the engine 10 and a planetary ratio ρ1 of the first planetary gear unit 13 (a ration between the number of teeth of the sun gear 16 and the number of teeth of the ring gear 19).

$$Ts1 = Te \times \rho1/(1+\rho1) \qquad \text{Equation (1)}$$

$$Tr1 = Te/(1+\rho1) \qquad \text{Equation (2)}$$

Furthermore, a torque Ts2 of the rotatable shaft of the sun gear of the second planetary gear unit 14 (the sun gear 21A of the planetary gear mechanism 20A) and a torque Tr2 of the rotatable shaft of the ring gear of the second planetary gear unit 14 (the ring gear 24B of the planetary gear mechanism 20B) can be expressed by the following equations (3) and (4), respectively, by using a torque TC2 of the rotatable shaft of the planetary carrier of the second planetary gear unit 14 (the ring gear 24A of the planetary gear mechanism 20A) and a planetary ratio ρ2 of the second planetary gear unit 14.

$$Ts2 = -TC2 \times \rho2/(1+\rho2) \qquad \text{Equation (3)}$$

$$Tr2 = -TC2/(1+\rho2) \qquad \text{Equation (4)}$$

Here, the planetary ratio ρ2 of the second planetary gear unit 14 can be obtained through the following equation by using a planetary ratio ρA of the planetary gear mechanism 20A (a ratio between the number of teeth of the sun gear 21A and the number of teeth of the ring gear 24A) and a planetary ratio ρB of the planetary gear mechanism 20B (a ratio between the number of teeth of the sun gear 21B and the number of teeth of the ring gear 24B).

$$\rho2 = \rho A \times \rho B/(\rho A+1)$$

Furthermore, a torque Tm of the second MG 12 is conducted to the rotatable shaft of the ring gear of the second planetary gear unit 14. Therefore, the torque Tm of the second MG 12 can be expressed by the following equation (5) by using the torque Tr2 of the rotatable shaft of the ring gear of the second planetary gear unit 14.

$Tm = -Tr2$       Equation (5)

Furthermore, the torque Ts1 of the rotatable shaft of the sun gear 16 of the first planetary gear unit 13 is split and is conducted to the rotatable shaft of the sun gear of the second planetary gear unit 14 and the first MG 11. Therefore, the torque Ts1 of the rotatable shaft of the sun gear 16 of the first planetary gear unit 13 can be expressed by the following equation (6) by using the torque Ts2 of the rotatable shaft of the sun gear of the second planetary gear unit 14 and a torque Tg of the first MG 11.

$Ts1 = -Ts2 - Tg$       Equation (6)

The torque Tr1 of the rotatable shaft of the ring gear 19 of the first planetary gear unit 13 and the torque TC2 of the rotatable shaft of the planetary carrier of the planetary gear unit 14 are both conducted to the drive force output shaft 26. Therefore, the torque Tp of the drive force output shaft 26 can be expressed by the following equation (7) by using the torque Tr1 of the rotatable shaft of the ring gear 19 of the first planetary gear unit 13 and the torque TC2 of the rotatable shaft of the planetary carrier of the second planetary gear unit 14.

$Tp = -Tr1 - TC2$       Equation (7)

Based on the above equations (1) to (7), the torque Tp, which is conducted to the drive force output shaft 26, and the torque Te of the engine 10 can be expressed by the following equations (8) and (9), respectively, by using the torque Tg of the first MG 11 and the torque Tm of the second MG 12.

$Tp = -(\rho 1 + \rho 1 \times \rho 2 + \rho 2) \times Tm/\rho 1 + Tg/\rho 1$       Equation (8)

$Te = \rho 2 \times (\rho 1 + 1) \times Tm/\rho 1 - (\rho 1 + 1) \times Tg/\rho 1$       Equation (9)

Figure 4A:
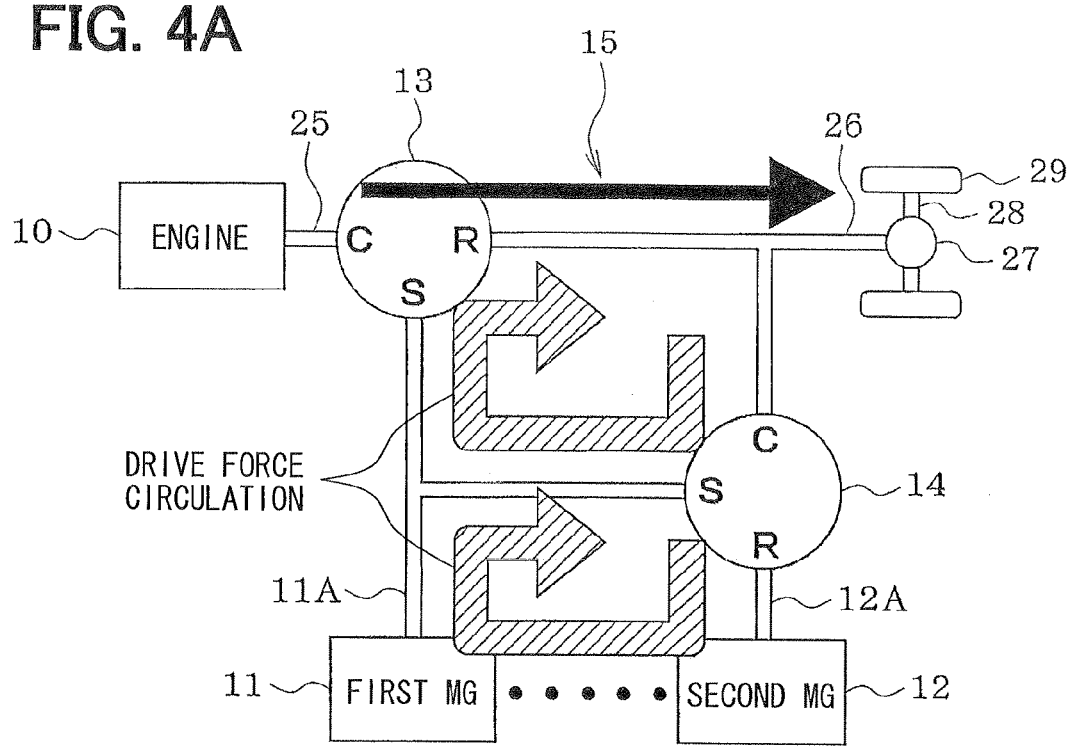
FIGS. 4A and 4B are diagrams showing states, in which circulation of a drive force is generated according to the first embodiment.
Figure 4B:
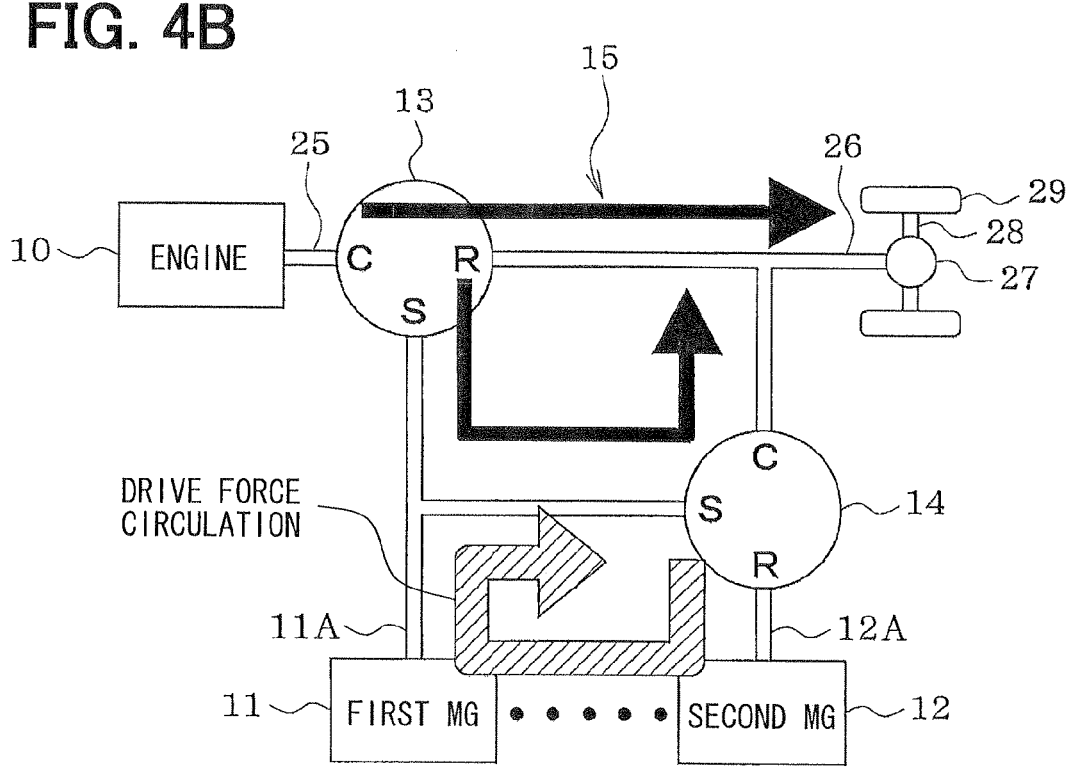

As shown in FIG. 3, in the drive system of the first embodiment, the two planetary gear units 13, 14 are used to split the drive force of the engine 10 in two stages. Therefore, in comparison to the prior art drive system, in which the single planetary gear mechanism is used to split the drive force of the engine, the total amount of drive forces, which are handled by the first and second MGs 11, 12, can be reduced. However, depending on the driving condition of the vehicle, a portion of the drive force, which is outputted from the engine 10 to the drive force output shaft 26, may be recirculated to the first MG 11 and the second MG 12. This recirculation of the drive force is known as power recirculation. Therefore, when the planetary ratios ρ1, ρ2 of the two planetary gear units 13, 14 are not appropriately set, the drive force, which is handled by the first MG 11 and the second MG 12, may not possibly be sufficiently reduced in some cases unless the planetary ratios ρ1, ρ2 of the planetary gear units 13, 14 are appropriately set. Specifically, as shown in FIG. 4A, in an operational range of the engine 10, in which a total input-to-output speed ratio (a ratio between the rotational speed of the drive force input shaft 25 and the rotational speed of the drive force output shaft 26) is low, the drive force, which is conducted to the first MG 11 and the second MG 12 by the power recirculation at the first planetary gear unit 13, may not possibly be sufficiently reduced. Furthermore, as shown in FIG. 4B, in an operational range of the engine 10, in which the total input-to-output speed ratio is high, the drive force, which is conducted to the first MG 11 and the second MG 12 by the power recirculation at the second planetary gear unit 14, may not possibly be sufficiently reduced.

In order to address the above disadvantage, the planetary ratio ρ1 of the first planetary gear unit 13 and the planetary ratio ρ2 of the second planetary gear unit 14 are set as follows according to the first embodiment.

Figure 5:
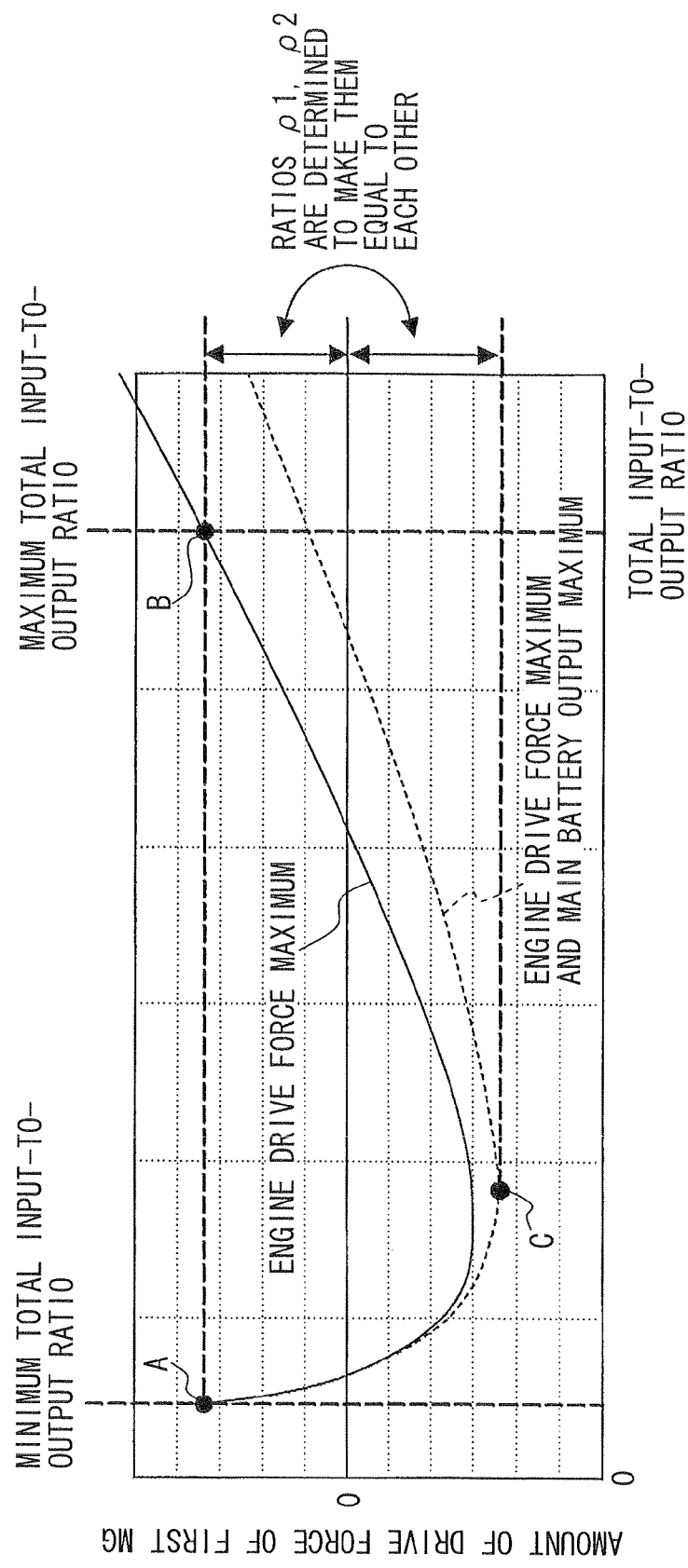
FIG. 5 is a diagram showing a method of setting planetary ratios of first and second planetary gear units.

Based on the relationship between each torque and the rotational speed shown in the alignment chart of FIG. 2, as shown in FIG. 5, the amount of drive force of the first MG 11 (the amount of drive force of the first MG 11 is a positive value in the case where the first MG 11 is operated as the electric motor) can be expressed as a function of the total input-to-output speed ratio Rall, which is a ratio of the rotational speed Ne of the engine 10 (i.e., the rotational speed of the drive force input shaft 25) over the rotational speed Np of the drive force output shaft 26 (i.e., Rall=Ne/Np). A solid line of FIG. 5 indicates the amount of drive force of the first MG 11 in a case where the drive force of the engine 10 is maximum, and the output of the main battery 33 is 0 (zero). A dotted line of FIG. 5 indicates the amount of drive force of the first MG 11 in a case where the drive force of the engine 10 is maximum, and the output of the main battery 33 is maximum.

Figure 6:
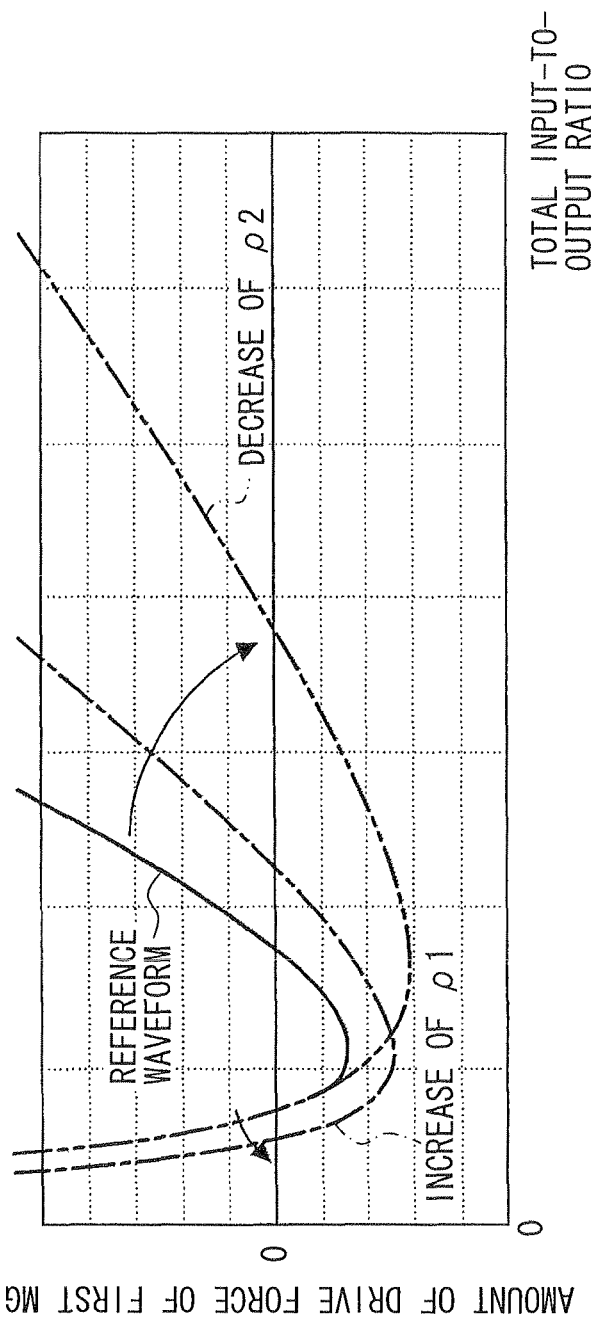
FIG. 6 is a diagram showing influences of the planetary ratios of the first and second planetary gear units according to the first embodiment.

The planetary ratio ρ1 of the first planetary gear unit 13 and the planetary ratio ρ2 of the second planetary gear unit 14 determine the split ratio of the drive force of the first planetary gear unit 13 and the split ratio of the drive force of the second planetary gear unit 14, respectively. Therefore, the relationship between the amount of drive force of the first MG 11 and the total input-to-output speed ratio changes depending on the planetary ratio ρ1 of the first planetary gear unit 13 and the planetary ratio ρ2 of the second planetary gear unit 14. Specifically, as shown in FIG. 6, in the case where the planetary ratio ρ1 of the first planetary gear unit 13 is increased, the amount of drive force of the first MG 11 is reduced in the operational range where the total input-to-output speed ratio is decreased. Also, in the case where the planetary ratio ρ2 of the second planetary gear unit 14 is decreased, the amount of drive force of the first MG 11 is decreased in the operational range where the total input-to-output speed ratio is high. Therefore, the power recirculation by the first planetary gear unit 13 can be decreased in the operational range where the total input-to-output speed ratio is low by increasing the planetary ratio ρ1 of the first planetary gear unit 13. Also, the power recirculation by the second planetary gear unit 14 can be decreased in the operational range where the total input-to-output speed ratio is high by decreasing the planetary ratio ρ2 of the second planetary gear unit 14.

In view of the above characteristics, the inventors of the present application have found the following fact through extensive study and experiments. That is, a maximum value of a sum of the drive force handled by the first MG 11 and the drive force handled by the second MG 12 is minimized in a range, which is from a first predetermined value of the total input-to-output speed ratio to a second predetermined value of the total input-to-output speed ratio, in a case where a maximum value (see A in FIG. 5) of the drive force of the first MG 11, which is generated when the total input-to-output speed ratio is the first predetermined value upon operation of the first MG 11 as the electric motor, a maximum value (see B in FIG. 5) of the drive force of the first MG 11, which is generated when the total input-to-output speed ratio is the second predetermined value upon operation of the first MG 11 as the electric motor, and a maximum value (see C in FIG. 5) of the drive force of the first MG 11, which is generated when the total input-to-output speed ratio is in a range from the first predetermined value to the second predetermined value (i.e., is a value that is larger than the first predetermined value and is smaller than the second predetermined value) upon operation of the first MG 11 as the electric generator, become equal to each other.

Therefore, in the first embodiment, the first predetermined value is set to be a minimum value of the total input-to-output speed ratio, and the second predetermined value is set to be a maximum value of the total input-to-output speed ratio. Furthermore, the planetary ratio $\rho 1$ of the first planetary gear unit 13 and the planetary ratio $\rho 2$ of the second planetary gear unit 14 are set such that all of the following values (I)-(III) become equal to each other: (I) the maximum value of the drive force of the first MG 11, which is generated when the total input-to-output speed ratio is the first predetermined value (minimum value) upon operation of the first MG 11 as the electric motor; (II) the maximum value of the drive force of the first MG 11, which is generated when the total input-to-output speed ratio is the second predetermined value (maximum value) upon operation of the first MG 11 as the electric motor; and (III) the maximum value of the drive force of the first MG 11, which is generated when the total input-to-output speed ratio is in the range from the first predetermined value (minimum value) to the second predetermined value (maximum value) upon operation of the first MG 11 as the electric generator. In this way, each of the planetary ratio $\rho 1$ of the first planetary gear unit 13 and the planetary ratio $\rho 2$ of the second planetary gear unit 14 can be set to the most appropriate planetary ratio (the planetary ratio, at which the maximum value of the sum of the drive force handled by the first MG 11 and the drive force handled by the second MG 12 is minimized). Thus, the maximum value of the sum of the drive force handled by the first MG 11 and the drive force handled by the second MG 12 can be minimized in the range from the minimum value to the maximum value of the total input-to-output speed ratio.

Figure 7:
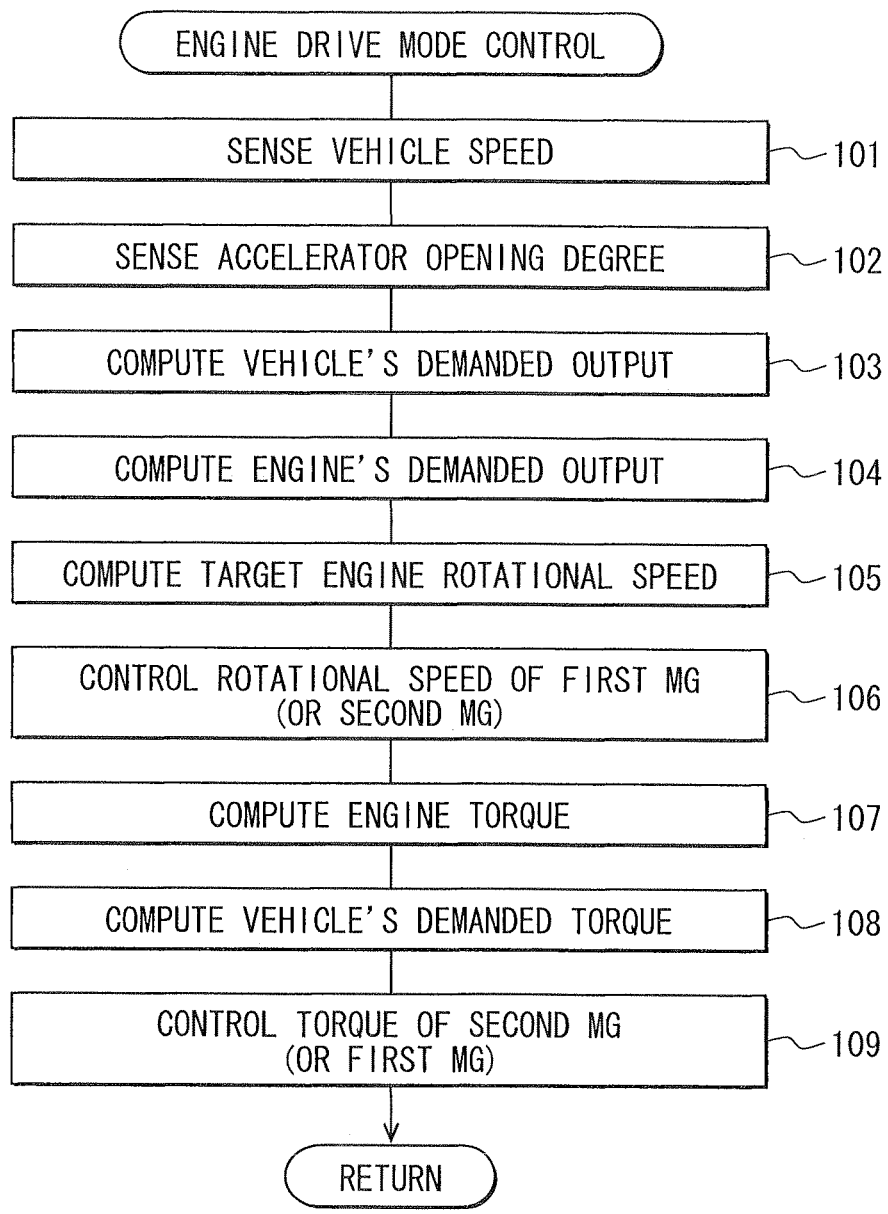
FIG. 7 is a flowchart showing a flow of an engine drive mode control routine according to the first embodiment.

Furthermore, in a case where the demanded output is outputted to the drive force output shaft 26 by changing the speed of rotation (drive force) of the engine 10 through the drive force transmission device 15 by executing an engine drive mode control routine, which is shown in FIG. 7 and will be described later, through the hybrid ECU 34, the rotational speed of the engine 10 is controlled through one (referred to as MG) of the first MG 11 and the second MG 12, and the torque of the drive force output shaft 26 is controlled through the other one (MG) of the first MG 11 and the second MG 12. At this time, the above role of controlling the rotational speed of the engine 10 and the above role of controlling the torque of the drive force output shaft 26 are switched between the first MG 11 and the second MG 12 depending on the driving condition of the vehicle. In this way, in the case where the vehicle is driven by the drive force of the engine 10, the demanded output can be outputted while efficiently driving the engine 10.

Figure 8:
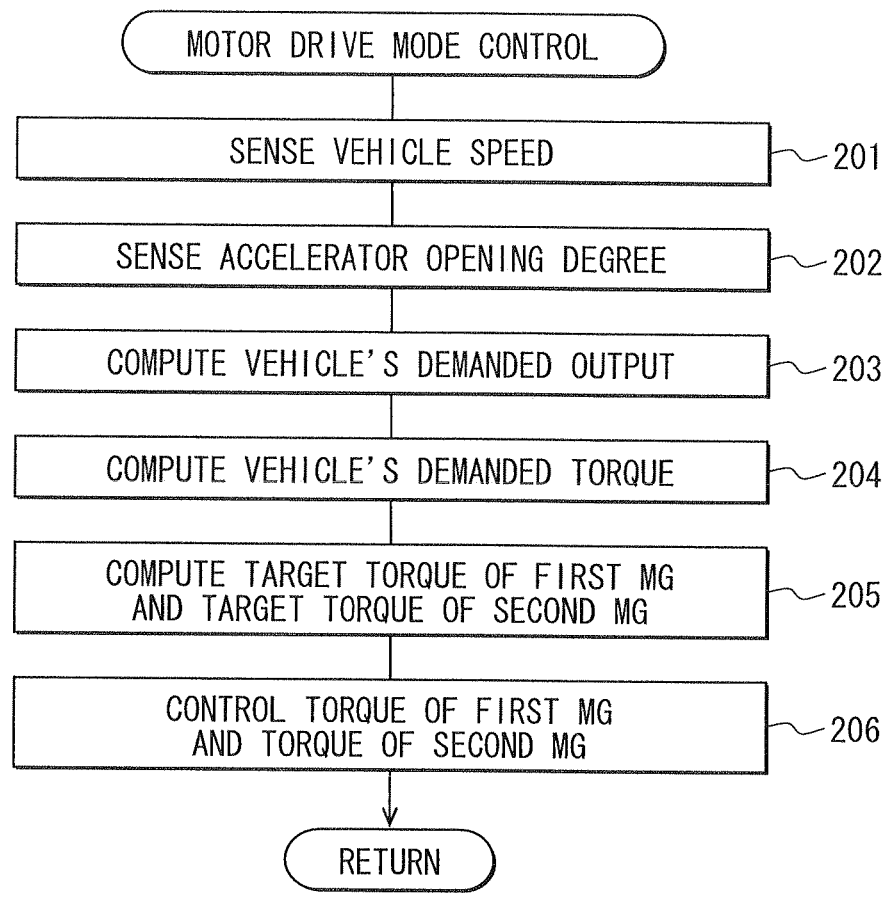
FIG. 8 is a flowchart showing a flow of a motor drive mode control routine according to the first embodiment.

Furthermore, in a case where the demanded output is outputted to the drive force output shaft 26 upon converting the electric power of the main battery 33 into the drive force through the drive force transmission device 15 by executing a motor drive mode control routine, which is shown in FIG. 8 and will be described later, through the hybrid ECU 34, the torque of the first MG 11 and the torque of the second MG 12 are generated at a corresponding ratio according to the planetary ratio $\rho 2$ of the second planetary gear unit 14 to control the torque of the drive force output shaft 26, or one (MG) of the first MG 11 and the second MG 12 is used to limit application of the torque to the engine 10, and the other one (MG) of the first MG 11 and the second MG 12 is used to control the torque of the drive force output shaft 26. In this way, in the case where the vehicle is driven by the drive force of the MG (the first MG 11 or the second MG 12) during the stop period of the engine 10, it is possible to limit the rotation of the engine 10 while controlling the torque of the drive force output shaft 26 through the MG (the first MG 11 or the second MG 12).

Furthermore, in a case where the drive force of the drive force output shaft 26 is converted into the electric power through the drive force transmission device 15 and is stored in the main battery 33 by executing a regeneration control routine (not shown), the torque of the first MG 11 and the torque of the second MG 12 may be generated at the ratio according to the planetary ratio $\rho 2$ of the second planetary gear unit 14 to control the torque of the drive force output shaft 26, or one (MG) of the first MG 11 and the second MG 12 is used to limit application of the torque to the engine 10, and the other one (MG) of the first MG 11 and the second MG 12 is used to control the torque of the drive force output shaft 26. In this way, in the case where the MG (the first MG 11 or the second MG 12) is driven by the drive force of the wheels 29 to generate the electric power during the stop period of the engine 10, it is possible to limit the rotation of the engine 10 while controlling the torque of the drive force output shaft 26 through the MG (the first MG 11 or the second MG 12).

Figure 9:
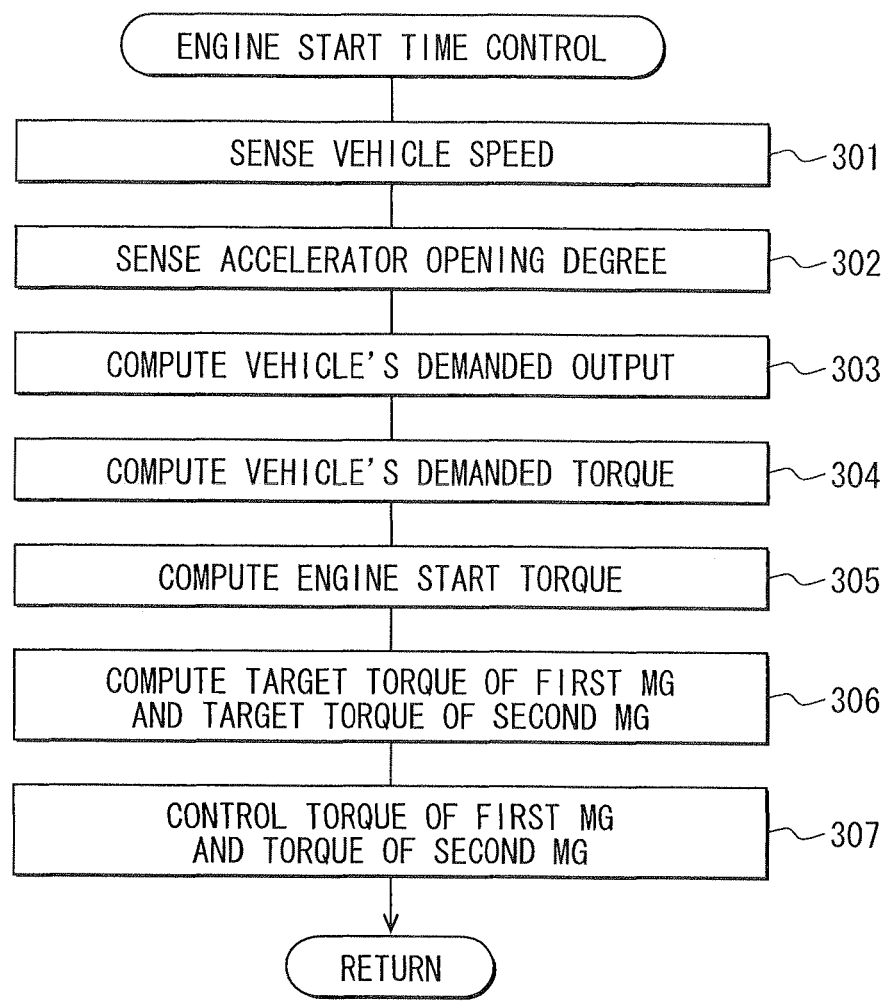
FIG. 9 is a flowchart showing a flow of an engine start time control routine according to the first embodiment.

Furthermore, in a case where the engine 10 is started by executing an engine start time control routine, which is shown in FIG. 9 and will be described later, through the hybrid ECU 34, the torque of the drive force output shaft 26 is controlled through one (MG) of the first MG 11 and the second MG 12, and the torque applied to the engine 10 is controlled through the other one (MG) of the first MG 11 and the second MG 12. In this way, the engine 10 can be started while controlling the torque of the drive force output shaft 26 with the drive force of the MG (the first MG 11 or the second MG 12).

In a case where the engine 10 is stopped by executing an engine stop control routine (not shown), the torque of the drive force output shaft 26 may be controlled through one (MG) of the first MG 11 and the second MG 12, and the torque applied to the engine 10 may be controlled through the other one (MG) of the first MG 11 and the second MG 12. In this way, the engine 10 can be stopped while controlling the torque of the drive force output shaft 26 through the drive force of the MG (the first MG 11 or the second MG 12).

Furthermore, in the case where the demanded output is outputted to the drive force output shaft 26 by changing the speed of rotation (drive force) of the engine 10 through the drive force transmission device 15 and converting the electric power of the main battery 33 into the drive force through the drive force transmission device 15 by executing a vehicle drive control routine (not shown) through the hybrid ECU 34, the rotational speed of the engine 10 may be controlled through one (MG) of the first MG 11 and the second MG 12, and the torque of the drive force output shaft 26 is controlled through the other one (MG) of the first MG 11 and the second MG 12. At that time, the role of controlling the rotational speed of the engine 10 and the role of controlling the torque of the drive force output shaft 26 may be switched between the first MG 11 and the second MG 12 depending on the driving condition of the vehicle. In this way, in the case where the drive force of the engine 10 and the drive force of the MG (the first MG 11 or the second MG 12) are both used to drive the vehicle, the demanded output can be outputted while efficiently operating the engine 10.

Now, the respective routines, which are executed by the hybrid ECU 34, will be described with reference to FIGS. 7 to 9.

Now, the engine drive mode control routine shown in FIG. 7 will be described. The engine drive mode control routine shown in FIG. 7 is repeatedly executed at predetermined intervals in the case where the demanded output is outputted to the drive force output shaft 26 by changing the speed of rotation of the engine 10 through the drive force transmission device 15. When the present routine starts, the vehicle speed is sensed at step 101. Thereafter, the operation proceeds to step 102 where the accelerator opening degree is sensed.

Then, the operation proceeds to step 103 where a vehicle's demanded output (the demanded output of the drive force output shaft 26), which corresponds to the vehicle speed and the accelerator opening degree, is computed by using a map or a mathematical equation. Thereafter, the operation proceeds to step 104 where an engine's demanded output is computed based on the vehicle's demanded output.

Thereafter, the operation proceeds to step 105 where a target engine rotational speed is computed based on the engine's demanded output. Then, the operation proceeds to step 106. At step 106, the rotational speed of the first MG 11 (or the second MG 12) is controlled such that the engine rotational speed coincides with the target engine rotational speed. In this way, the engine rotational speed is controlled to coincide with the target engine rotational speed.

Next, the operation proceeds to step 107 where the engine torque is computed based on the engine's operational state (e.g., an intake air quantity, a fuel injection quantity and/or ignition timing). Then, the operation proceeds to step 108 where a vehicle's demanded torque, which corresponds to the vehicle's demanded output and the vehicle speed, is computed by using a map or a mathematical equation.

Thereafter, the operation proceeds to step 109 where the torque of the second MG 12 (or the first MG 11) is controlled such that the second MG 12 (or the first MG 11) outputs a torque shortfall (i.e., a torque, which corresponds to a difference between the vehicle's demanded torque and the engine torque). In this way, the torque of the drive force output shaft 26 is controlled to coincide with the vehicle's demanded torque.

At this time, the role of controlling the rotational speed of the engine 10 and the role of controlling the torque of the drive force output shaft 26 are switched between the first MG 11 and the second MG 12.

Now, the motor drive mode control routine shown in FIG. 8 will be described. The motor drive mode control routine shown in FIG. 8 is repeatedly executed at predetermined intervals in the case where the demanded output is outputted to the drive force output shaft 26 by converting the electric power of the main battery 33 into the drive force through the drive force transmission device 15. When the present routine starts, the vehicle speed is sensed at step 201. Thereafter, the operation proceeds to step 202 where the accelerator opening degree is sensed.

Then, the operation proceeds to step 203 where a vehicle's demanded output (the demanded output of the drive force output shaft 26), which corresponds to the vehicle speed and the accelerator opening degree, is computed by using a map or a mathematical equation. Thereafter, the operation proceeds to step 204 where a vehicle's demanded torque is computed based on the vehicle's demanded output.

Then, the operation proceeds to step 205 where a target torque of the first MG 11 and a target torque of the second MG 12 are computed based on the vehicle's demanded torque and the planetary ratio $\rho 2$ of the second planetary gear unit 14. Next, the operation proceeds to step 206 where the torque of the first MG 11 is controlled such that the first MG 11 outputs the target torque of the first MG 11, and the torque of the second MG 12 is controlled such that the second MG 12 outputs the target torque of the second MG 12. In this way, the torque of the first MG 11 and the torque of the second MG 12 are generated at the ratio according to the planetary ratio $\rho 2$ of the second planetary gear unit 14 to control the torque of the drive force output shaft 26.

Here, the first MG 11 (or the second MG 12) may be used to limit application of the torque on the engine 10, and the second MG 12 (or the first MG 11) may be used to control the torque of the drive force output shaft 26.

Now, the engine start time control routine shown in FIG. 9 will be described. The engine start time control routine shown in FIG. 9 is repeatedly executed at predetermined intervals in the case where the engine 10 is started. When the present routine starts, the vehicle speed is sensed at step 301. Thereafter, the operation proceeds to step 302 where the accelerator opening degree is sensed.

Then, the operation proceeds to step 303 where a vehicle's demanded output (the demanded output of the drive force output shaft 26), which corresponds to the vehicle speed and the accelerator opening degree, is computed by using a map or a mathematical equation. Thereafter, the operation proceeds to step 304 where a vehicle's demanded torque is computed based on the vehicle's demanded output.

Thereafter, the operation proceeds to step 305 where an engine start torque (a torque required to crank the engine 10) is computed. Then, the operation proceeds to step 306 where a target torque of the first MG 11 and a target torque of the second MG 12 are computed based on the vehicle's demanded torque, the engine start torque, the planetary ratio $\rho 1$ of the first planetary gear unit 13 and the planetary ratio $\rho 2$ of the second planetary gear unit 14.

Thereafter, the operation proceeds to step 307 where the torque of the first MG 11 is controlled such that the first MG 11 outputs the target torque of the first MG 11, and the second MG 12 is controlled such that the second MG 12 outputs the target torque of the second MG 12. Thereby, the torque of the drive force output shaft 26 is controlled through the first MG 11 (or the second MG 12), and the torque, which is applied to the engine 10, is controlled through the second MG 12 (or the first MG 11).

The operation of each routine shown in FIGS. 7 to 9 may be appropriately changed. Furthermore, each routine shown in FIGS. 7 and 9 may be executed by the engine ECU 38, the first MG ECU 39 or the second MG ECU 40.

In the first embodiment discussed above, the planetary ratio $\rho 1$ of the first planetary gear unit 13 and the planetary ratio $\rho 1$ of the second planetary gear unit 14 are set such that all of the following values (I)-(III) become equal to each other: (I) the maximum value of the drive force of the first MG 11, which is generated when the total input-to-output speed ratio is the first predetermined value (minimum value) upon operation of the first MG 11 as the electric motor; (II) the maximum value of the drive force of the first MG 11, which is generated when the total input-to-output speed ratio is the second predetermined value (maximum value) upon operation of the first MG 11 as the electric motor; and (III) the maximum value of the drive force of the first MG 11, which is generated when the total input-to-output speed ratio is in the range from the first predetermined value (minimum value) to the second predetermined value (maximum value) upon operation of the first MG 11 as the electric generator. Therefore, each of the planetary ratio $\rho 1$ of the first planetary gear unit 13 and the planetary ratio $\rho 2$ of the second planetary gear unit 14 is set to the most appropriate planetary ratio (the planetary ratio, at which the maximum value of the sum of the drive force handled by the first MG 11 and the drive force handled by the second MG 12 is minimized). Thus, the maximum value of the sum of the drive force handled by the first MG 11 and the drive force handled by the second MG 12 can be minimized in the range from the minimum value to the maximum value of the total input-to-output speed ratio. In this way, in the system having the two planetary gear units 13, 14, the drive forces, which are handled by the first MG 11 and the second MG 12, can be effectively reduced. Thereby, the sizes of the electric components, such as the first MG 11, the second MG 12, the first inverter 31 and the second inverter 32, are reduced to ease the installation of these electric components on the vehicle, and the electrical loss can be reduced to improve the fuel consumption.

The most appropriate planetary ratio of the second planetary gear unit 14 (the planetary ratio, at which the maximum value of the sum of the drive forces handled by the first MG 11 and the second MG 12 is minimized) is a relatively small value (e.g., equal to or smaller than 0.1). The planetary ratio is a ratio between the number of the teeth of the sun gear and the number of the teeth of the ring gear. Therefore, in the case where the second planetary gear unit 14 is formed by the single planetary gear mechanism, the most appropriate planetary ratio can be achieved by reducing the planetary ratio of the second planetary gear unit 14. This may be achieved by reducing a radius of the sun gear to reduce the number of the teeth of the sun gear or by increasing a radius of the ring gear to increase the number of the teeth of the ring gear. However, when the radius of the sun gear is reduced, the strength of the second planetary gear unit 14 may possibly become insufficient. In contrast, when the radius of the ring gear is increased, an outer diameter of the second planetary gear unit 14 may be disadvantageously increased.

In view of the above disadvantages, according to the first embodiment, the second planetary gear unit 14 is formed as the compounded planetary gear mechanism, which includes the planetary gear mechanism 20A and the planetary gear mechanism 20B. Therefore, the most appropriate planetary ratio of the second planetary gear unit 14 can be achieved without increasing the outer diameter of the second planetary gear unit 14 while achieving the sufficient strength of the second planetary gear unit 14.

Figure 10:
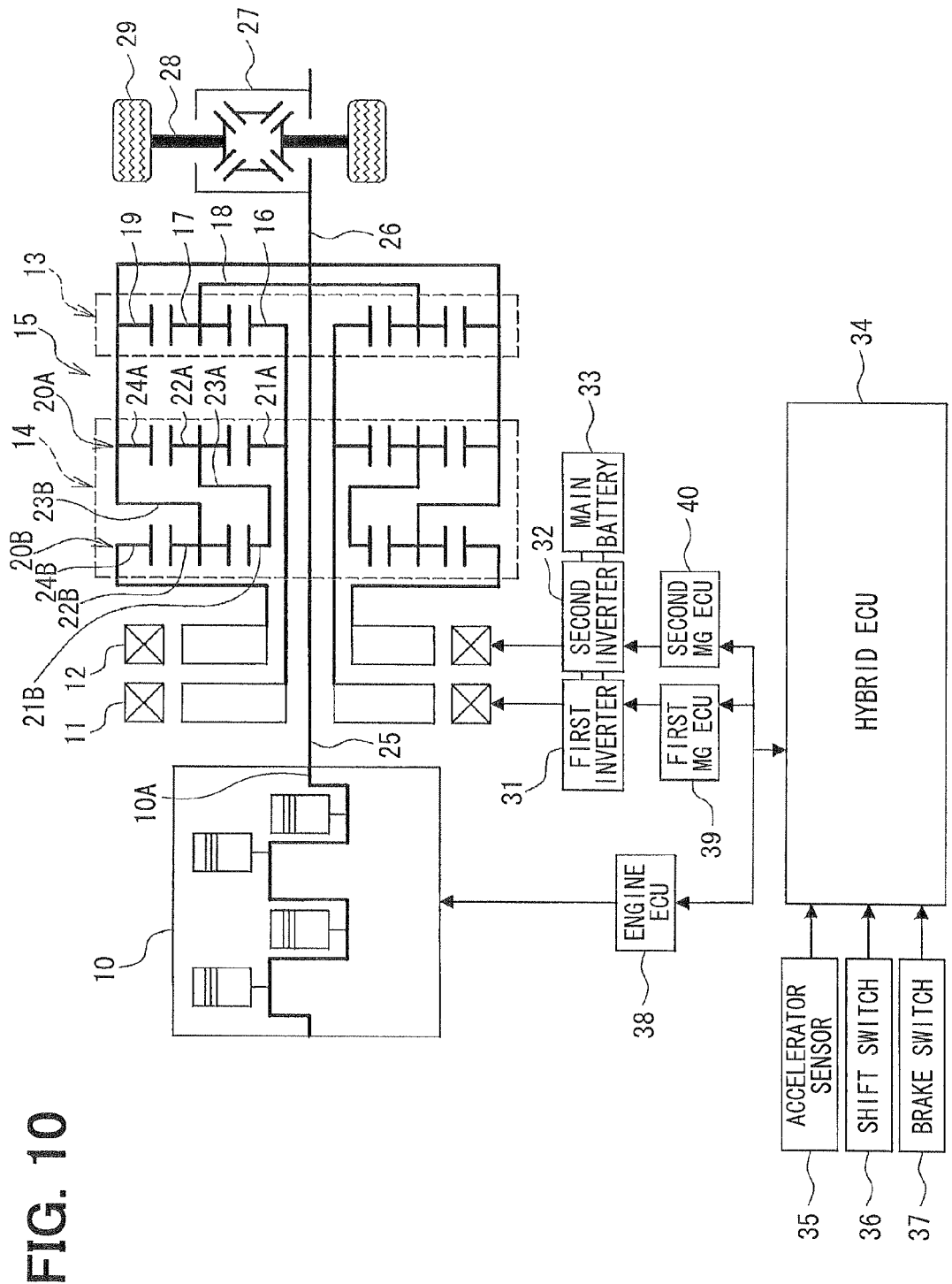
FIG. 10 is a schematic diagram showing a structure of a drive system in a modification of the first embodiment.

Furthermore, according to the first embodiment, as shown in FIG. 1, the engine 10, the first and second MGs 11, 12 and the first and second planetary gear units 13, 14 are arranged one after another in a transverse direction of the vehicle (the direction parallel to the axle 28). This arrangement is suitable for a front-engine front-drive (FF) vehicle. However, the arrangement of the engine 10, the first and second MGs 11, 12, the first and second planetary gear units 13, 14 is not limited to this one and may be modified in any appropriate manner. For example, as shown in FIG. 10, the engine 10, the first and second MGs 11, 12 and the first and second planetary gear units 13, 14 may be placed one after another in the longitudinal direction, i.e., the front-to-rear direction of the vehicle (the direction perpendicular to the axle 28). This arrangement is suitable for a front-engine rear-drive (FR) vehicle.

In the first embodiment, the first predetermined value is set to be the minimum value of the total input-to-output speed ratio, and the second predetermined value is set to be the maximum value of the total input-to-output speed ratio. However, the first predetermined value and the second predetermined value are not limited to these values and may be modified in an appropriate manner.

In ordinary vehicles, the minimum value of the total input-to-output speed ratio is often set to be about 0.3 to 0.5, and the maximum value of the total input-to-output speed ratio is often set to be about 1.8 to 3.0. Therefore, the first predetermined value may be set to a value (e.g., 0.4), which is equal to or larger than 0.3 and is equal to or smaller than 0.5, and the second predetermined value may be set to a value (e.g., 2.5), which is equal to or larger than 1.8 and is equal to or smaller than 3.0. In this way, the maximum value of the sum of the drive forces, which are handled by the first and second MGs 11, 12, can be minimized in the range from the minimum value (or a value therearound) to the maximum value (or a value therearound) of the total input-to-output speed ratio.

Alternatively, the first predetermined value may be set to the minimum value of the total input-to-output speed ratio used for city driving of the vehicle, and the second predetermined value may be set to the maximum value of the total input-to-output speed ratio used for the city driving of the vehicle. In this way, the maximum value of the sum of the drive forces, which are handled by the two MG 11, 12, can be minimized in the range from the minimum value to the maximum value of the total input-to-output speed ratio used for the city driving of the vehicle.

Furthermore, the first predetermined value may be set to the minimum value of the total input-to-output speed ratio used for JC08 mode or 10-15 mode, which are Japanese official fuel-economy test cycles. Also, the second predetermined value may be set to the maximum value of the total input-to-output speed ratio used for JC08 mode or 10-15 mode. In this way, the maximum value of the sum of the drive forces, which are handled by the two MGs 11, 12, can be minimized in the range from the minimum value to the maximum value of the total input-to-output speed ratio used for JC08 mode or 10-15 mode specified in Japan.

Furthermore, the first predetermined value may be set to the minimum value of the total input-to-output speed ratio used for EU mode, which is the European official fuel-economy test cycle. Also, the second predetermined value may be set to the maximum value of the total input-to-output speed ratio used for EU mode. In this way, the maximum value of the sum of the drive forces, which are handled by the two MGs 11, 12, can be minimized in the range from the minimum value to the maximum value of the total input-to-output speed ratio used for EU mode specified in Europe.

Furthermore, the first predetermined value may be set to the minimum value of the total input-to-output speed ratio used for LA#4 mode or US06 mode, which are US official fuel-economy test cycles. Also, the second predetermined value may be set to the maximum value of the total input-to-output speed ratio used for LA#4 mode or US06 mode. In this way, the maximum value of the sum of the drive forces, which are handled by the two MGs 11, 12, can be minimized in the range from the minimum value to the maximum value of the total input-to-output speed ratio used for LA#4 mode or US06 mode specified in the United States.

Furthermore, the minimum value and the maximum value of the total input-to-output speed ratio used for the drive mode specified in any other country, which is other than Japan, Europe and the United States, may be set as the first predetermined value and the second predetermined value, respectively.

Next, second to eighth embodiments of the present invention will be described with reference to FIGS. 11 to 17. In the following description, components, which are similar to those of the first embodiment, will be indicated by the same reference numerals and will not be described redundantly for the sake of simplicity.

Second Embodiment

Figure 11:
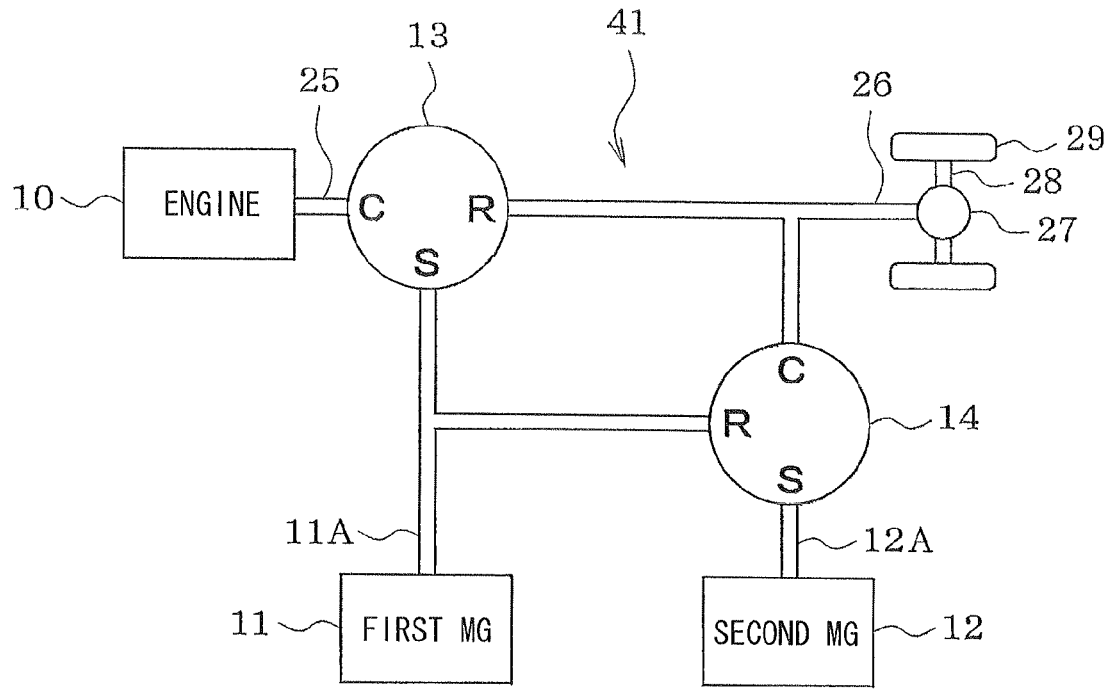
FIG. 11 is a schematic diagram showing a structure of a drive force transmission device and therearound according to a second embodiment of the present invention.

In the second embodiment of the present invention, as shown in FIG. 11, the drive force transmission device 41 is constructed such that the drive force input shaft 25 and the planetary carrier of the first planetary gear unit 13 are connected with each other in a manner that enables conduction of the drive force therebetween (i.e., are connected with each other to conduct the drive force therebetween), and the sun gear of the first planetary gear unit 13, the ring gear of the second planetary gear unit 14 and the rotatable shaft 11A of the first MG 11 are connected with each other in a manner that enables conduction of the drive force therebetween (i.e., are connected with each other to conduct the drive force therebetween). Furthermore, the ring gear of the first planetary gear unit 13, the planetary carrier of the second planetary gear unit 14 and the drive force output shaft 26 are connected with each other in a manner that enables conduction of the drive force therebetween (i.e., are connected with each other to conduct the drive force therebetween), and the sun gear of the second planetary gear unit 14 and the rotatable shaft 12A of the second MG 12 are connected with each other in a manner that enables conduction of the drive force therebetween (i.e., are connected with each other to conduct the drive force therebetween).

Third Embodiment

Figure 12:
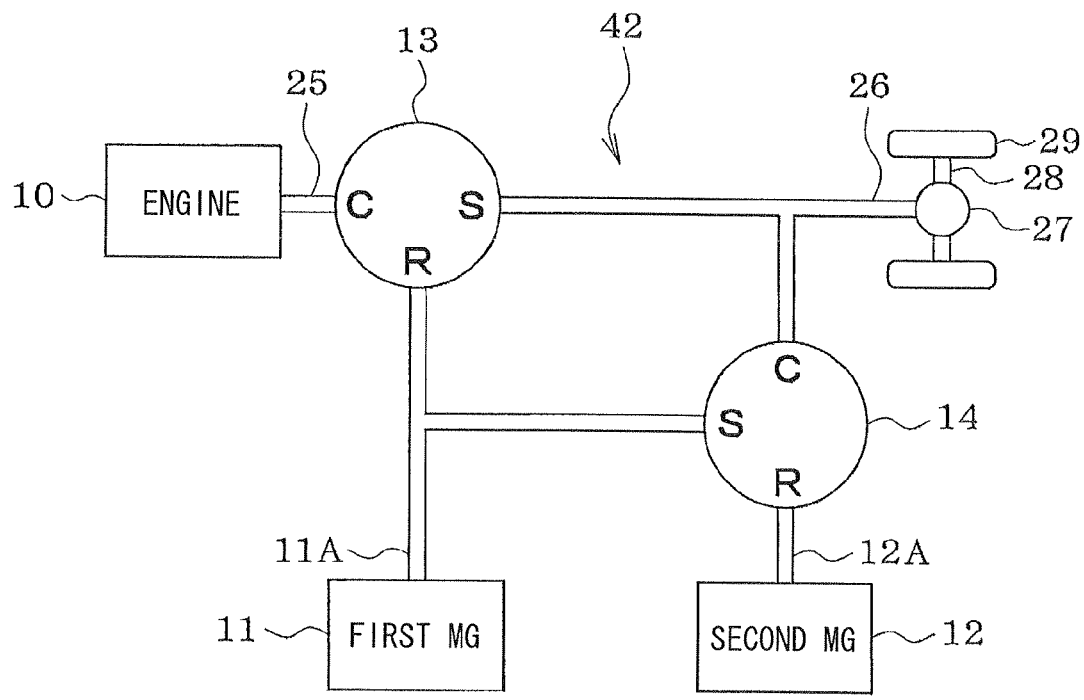
FIG. 12 is a schematic diagram showing a structure of a drive force transmission device and therearound according to a third embodiment of the present invention.

In the third embodiment of the present invention, as shown in FIG. 12, the drive force transmission device 42 is constructed such that the drive force input shaft 25 and the planetary carrier of the first planetary gear unit 13 are connected with each other in a manner that enables conduction of the drive force therebetween (i.e., are connected with each other to conduct the drive force therebetween), and the ring gear of the first planetary gear unit 13, the sun gear of the second planetary gear unit 14 and the rotatable shaft 11A of the first MG 11 are connected with each other in a manner that enables conduction of the drive force therebetween (i.e., are connected with each other to conduct the drive force therebetween). Furthermore, the sun gear of the first planetary gear unit 13, the planetary carrier of the second planetary gear unit 14 and the drive force output shaft 26 are connected with each other in a manner that enables conduction of the drive force therebetween (i.e., are connected with each other to conduct the drive force therebetween), and the ring gear of the second planetary gear unit 14 and the rotatable shaft 12A of the second MG 12 are connected with each other in a manner that enables conduction of the drive force therebetween (i.e., are connected with each other to conduct the drive force therebetween).

Fourth Embodiment

Figure 13:
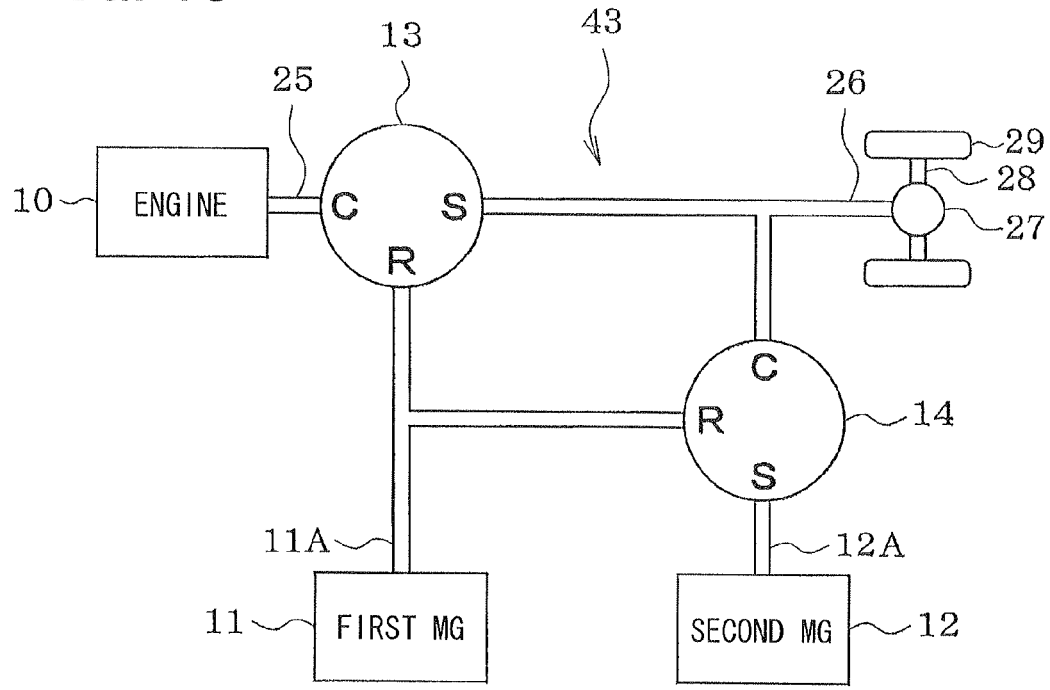
FIG. 13 is a schematic diagram showing a structure of a drive force transmission device and therearound according to a fourth embodiment of the present invention.

In the fourth embodiment of the present invention, as shown in FIG. 13, the drive force transmission device 43 is constructed such that the drive force input shaft 25 and the planetary carrier of the first planetary gear unit 13 are connected with each other in a manner that enables conduction of the drive force therebetween (i.e., are connected with each other to conduct the drive force therebetween), and the ring gear of the first planetary gear unit 13, the ring gear of the second planetary gear unit 14 and the rotatable shaft 11A of the first MG 11 are connected with each other in a manner that enables conduction of the drive force therebetween (i.e., are connected with each other to conduct the drive force therebetween). Furthermore, the sun gear of the first planetary gear unit 13, the planetary carrier of the second planetary gear unit 14 and the drive force output shaft 26 are connected with each other in a manner that enables conduction of the drive force therebetween (i.e., are connected with each other to conduct the drive force therebetween), and the sun gear of the second planetary gear unit 14 and the rotatable shaft 12A of the second MG 12 are connected with each other in a manner that enables conduction of the drive force therebetween (i.e., are connected with each other to conduct the drive force therebetween).

Fifth Embodiment

Figure 14:
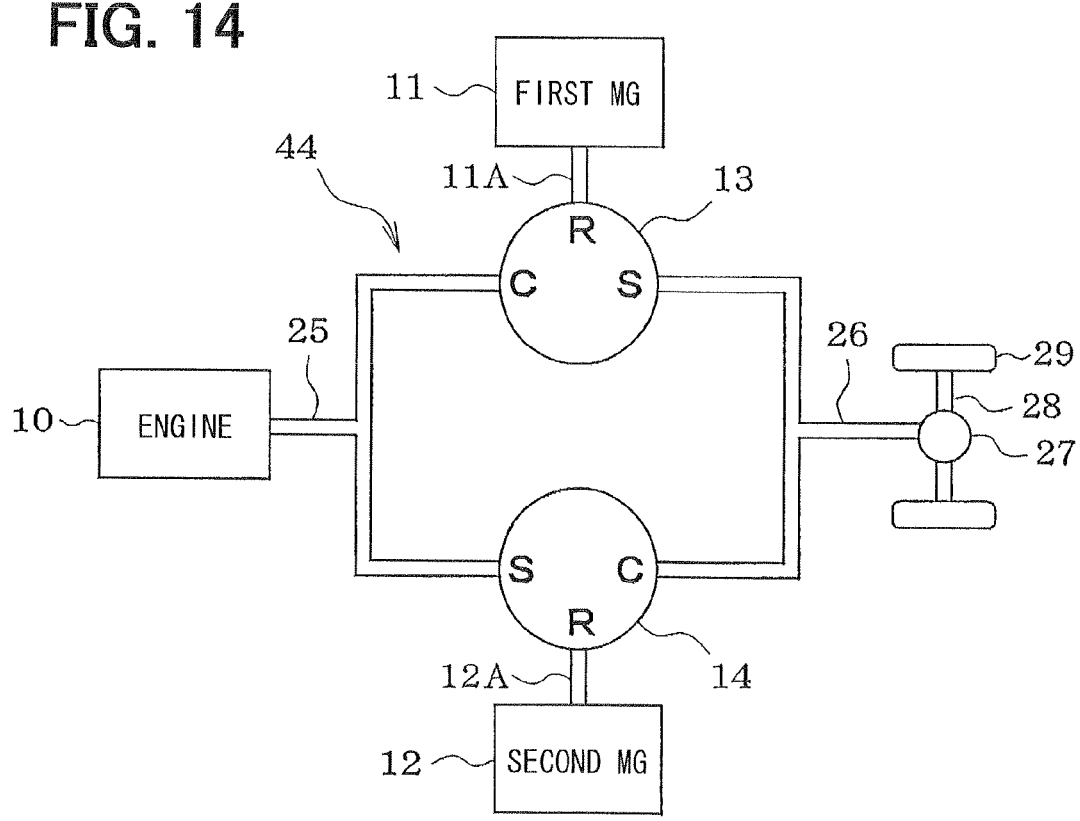
FIG. 14 is a schematic diagram showing a structure of a drive force transmission device and therearound according to a fifth embodiment of the present invention.

In the fifth embodiment of the present invention, as shown in FIG. 14, the drive force transmission device 44 is constructed such that the drive force input shaft 25, the planetary carrier of the first planetary gear unit 13 and the sun gear of the second planetary gear unit 14 are connected with each other in a manner that enables conduction of the drive force therebetween (i.e., are connected with each other to conduct the drive force therebetween), and the ring gear of the first planetary gear unit 13 and the rotatable shaft 11A of the first MG 11 are connected with each other in a manner that enables conduction of the drive force therebetween (i.e., are connected with each other to conduct the drive force therebetween). Furthermore, the sun gear of the first planetary gear unit 13, the planetary carrier of the second planetary gear unit 14 and the drive force output shaft 26 are connected with each other in a manner that enables conduction of the drive force therebetween (i.e., are connected with each other to conduct the drive force therebetween), and the ring gear of the second planetary gear unit 14 and the rotatable shaft 12A of the second MG 12 are connected with each other in a manner that enables conduction of the drive force therebetween (i.e., are connected with each other to conduct the drive force therebetween).

Sixth Embodiment

Figure 15:
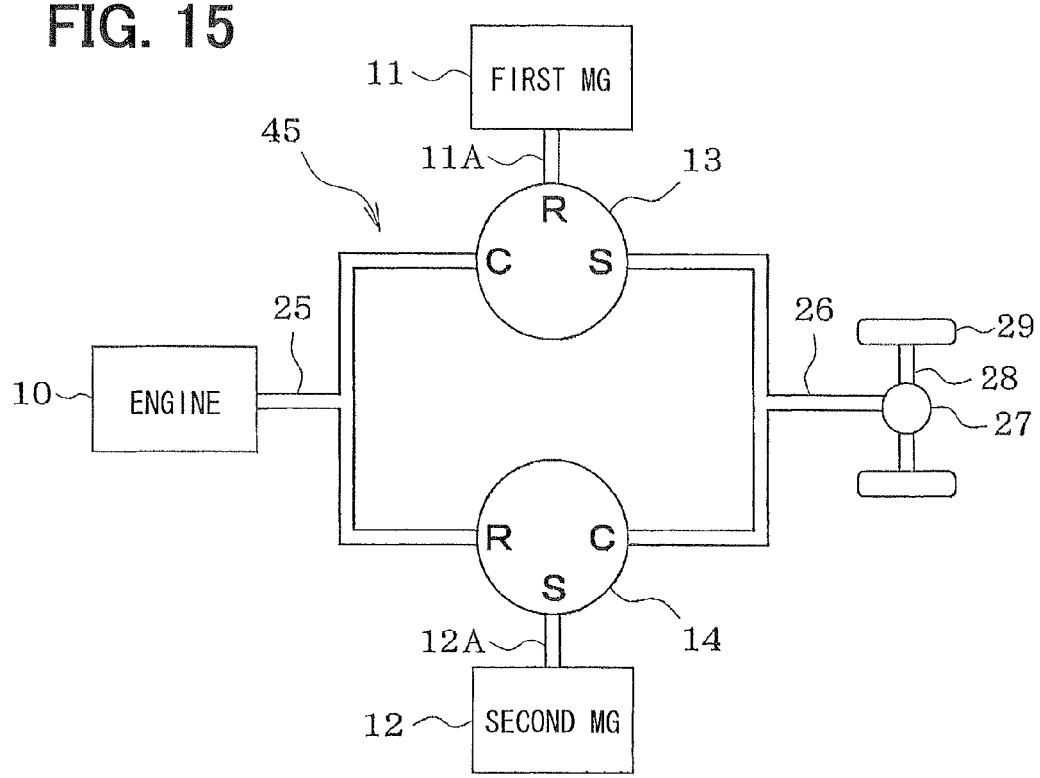
FIG. 15 is a schematic diagram showing a structure of a drive force transmission device and therearound according to a sixth embodiment of the present invention.

In the sixth embodiment of the present invention, as shown in FIG. 15, the drive force transmission device 45 is constructed such that the drive force input shaft 25, the planetary carrier of the first planetary gear unit 13 and the ring gear of the second planetary gear unit 14 are connected with each other in a manner that enables conduction of the drive force therebetween (i.e., are connected with each other to conduct the drive force therebetween), and the ring gear of the first planetary gear unit 13 and the rotatable shaft 11A of the first MG 11 are connected with each other in a manner that enables conduction of the drive force therebetween (i.e., are connected with each other to conduct the drive force therebetween). Furthermore, the sun gear of the first planetary gear unit 13, the planetary carrier of the second planetary gear unit 14 and the drive force output shaft 26 are connected with each other in a manner that enables conduction of the drive force therebetween (i.e., are connected with each other to conduct the drive force therebetween), and the sun gear of the second planetary gear unit 14 and the rotatable shaft 12A of the second MG 12 are connected with each other in a manner that enables conduction of the drive force therebetween (i.e., are connected with each other to conduct the drive force therebetween).

Seventh Embodiment

Figure 16:
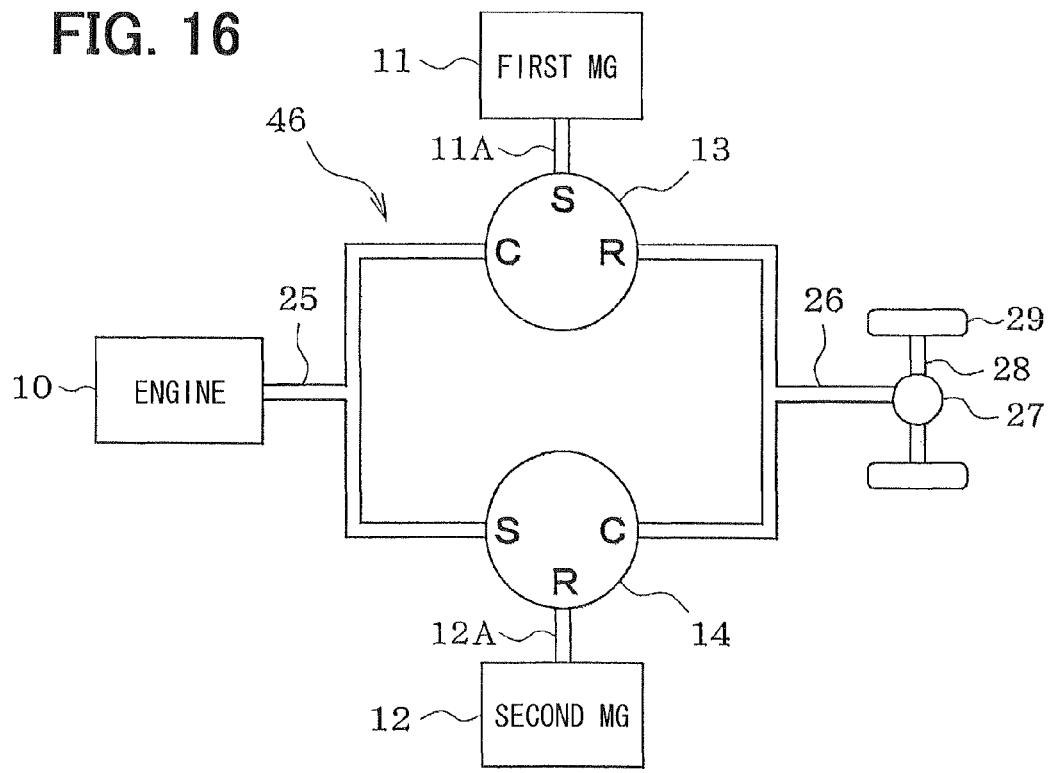
FIG. 16 is a schematic diagram showing a structure of a drive force transmission device and therearound according to a seventh embodiment of the present invention.

In the seventh embodiment of the present invention, as shown in FIG. 16, the drive force transmission device 46 is constructed such that the drive force input shaft 25, the planetary carrier of the first planetary gear unit 13 and the sun gear of the second planetary gear unit 14 are connected with each other in a manner that enables conduction of the drive force therebetween (i.e., are connected with each other to conduct the drive force therebetween), and the sun gear of the first planetary gear unit 13 and the rotatable shaft 11A of the first MG 11 are connected with each other in a manner that enables conduction of the drive force therebetween (i.e., are connected with each other to conduct the drive force therebetween). Furthermore, the ring gear of the first planetary gear unit 13, the planetary carrier of the second planetary gear unit 14 and the drive force output shaft 26 are connected with each other in a manner that enables conduction of the drive force therebetween (i.e., are connected with each other to conduct the drive force therebetween), and the ring gear of the second planetary gear unit 14 and the rotatable shaft 12A of the second MG 12 are connected with each other in a manner that enables conduction of the drive force therebetween (i.e., are connected with each other to conduct the drive force therebetween).

Eighth Embodiment

Figure 17:
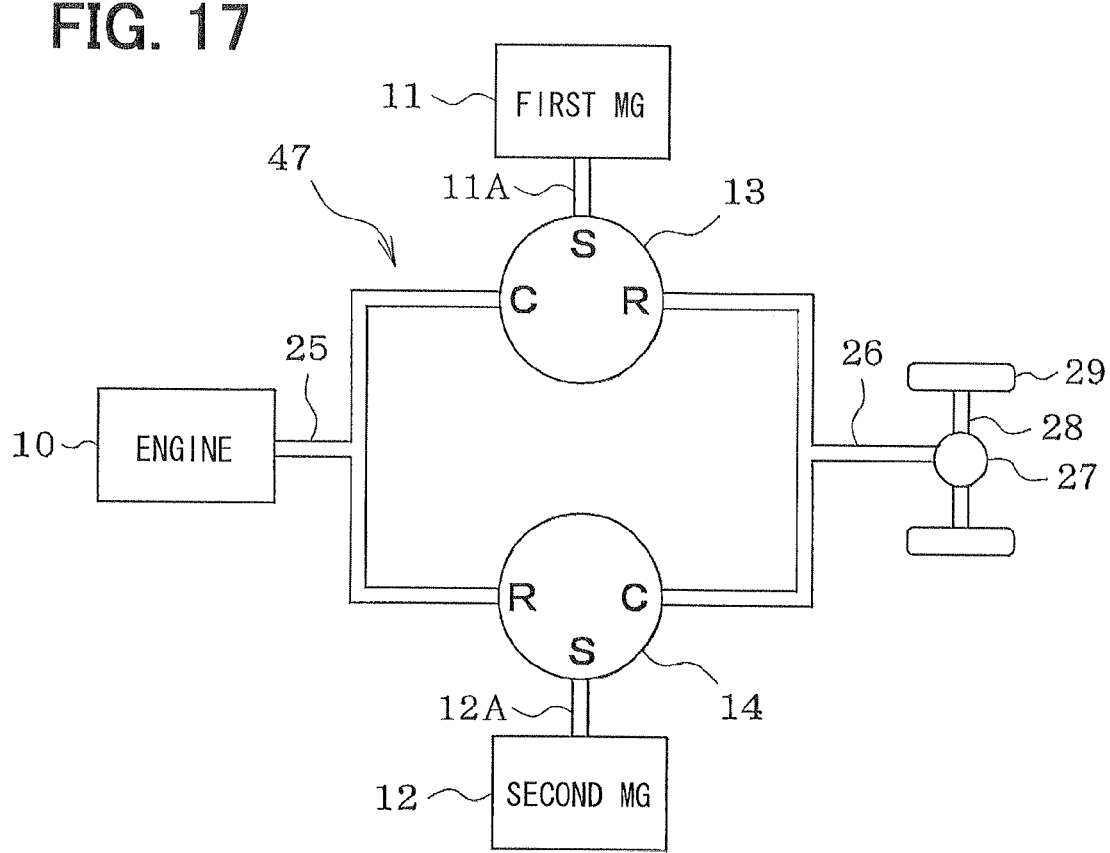
FIG. 17 is a schematic diagram showing a structure of a drive force transmission device and therearound according to an eighth embodiment of the present invention.

In the eighth embodiment of the present invention, as shown in FIG. 17, the drive force transmission device 47 is constructed such that the drive force input shaft 25, the planetary carrier of the first planetary gear unit 13 and the ring gear of the second planetary gear unit 14 are connected with each other in a manner that enables conduction of the drive force therebetween (i.e., are connected with each other to conduct the drive force therebetween), and the sun gear of the first planetary gear unit 13 and the rotatable shaft 11A of the first MG 11 are connected with each other in a manner that enables conduction of the drive force therebetween (i.e., are connected with each other to conduct the drive force therebetween). Furthermore, the ring gear of the first planetary gear unit 13, the planetary carrier of the second planetary gear unit 14 and the drive force output shaft 26 are connected with each other in a manner that enables conduction of the drive force therebetween (i.e., are connected with each other to conduct the drive force therebetween), and the sun gear of the second planetary gear unit 14 and the rotatable shaft 12A of the second MG 12 are connected with each other in a manner that enables conduction of the drive force therebetween (i.e., are connected with each other to conduct the drive force therebetween).

Even in the second to eighth embodiments discussed above, the planetary ratio ρ1 of the first planetary gear unit 13 and the planetary ratio ρ2 of the second planetary gear unit 14 are set such that all of the following values (I)-(III) become equal to each other: (I) the maximum value of the drive force of the first MG 11, which is generated when the total input-to-output speed ratio is the first predetermined value (minimum value) upon operation of the first MG 11 as the electric motor; (II) the maximum value of the drive force of the first MG 11, which is generated when the total input-to-output speed ratio is the second predetermined value (maximum value) upon operation of the first MG 11 as the electric motor; and (III) the maximum value of the drive force of the first MG 11, which is generated when the total input-to-output speed ratio is in the range from the first predetermined value (minimum value) to the second predetermined value (maximum value) upon operation of the first MG 11 as the electric generator. Thus, the maximum value of the sum of the drive force handled by the first MG 11 and the drive force handled by the second MG 12 can be minimized in the range from the first predetermined value to the second predetermined value of the total input-to-output speed ratio.

Furthermore, additional advantages and modifications will readily occur to those skilled in the art. The invention in its broader terms is therefore not limited to the above specific details, representative apparatus, and illustrative examples.

What is claimed is:

1. A drive force output apparatus for a vehicle, comprising:
    a drive source that outputs a drive force;
    at least two motor generators, which include a first motor generator and a second motor generator; and
    a drive force transmission device that has at least two planetary gear mechanisms, which include a first planetary gear mechanism and a second planetary gear mechanism;
    an electric power source that is adapted to supply an electric power to or receive an electric power from the first motor generator and the second motor generator; and
    control means for controlling the drive source, the first motor generator and the second motor generator, wherein:
    a drive force input shaft is connected to an output shaft of the drive source to conduct the drive force between the drive force input shaft and the output shaft of the drive source;
    a drive force output shaft is connected to a wheel of the vehicle to conduct a drive force between the drive force output shaft and the wheel of the vehicle;
    the drive force input shaft, a rotatable shaft of the first motor generator, a rotatable shaft of the second motor generator and the drive force output shaft are connected with each other through the drive force transmission device to conduct a drive force therebetween;
    a planetary ratio of the first planetary gear mechanism and a planetary ratio of the second planetary gear mechanism are set such that all of the following values become equal to each other:
        a maximum value of a drive force of the first motor generator, which is generated when a total input-to-output speed ratio between a rotational speed of the drive force input shaft and a rotational speed of the drive force output shaft is a first predetermined value upon operation of the first motor generator as an electric motor;
        a maximum value of a drive force of the first motor generator, which is generated when the total input-to-output speed ratio is a second predetermined value that is larger than the first predetermined value upon operation of the first motor generator as the electric motor; and
        a maximum value of a drive force of the first motor generator, which is generated when the total input-to-output speed ratio is in a range from the first predetermined value to the second predetermined value upon operation of the first motor generator as an electric generator; and
    the control means controls the first motor generator and the second motor generator according to a demanded output of the drive force output shaft.

2. The drive force output apparatus according to claim 1, wherein:
    the drive force input shaft is connected to a planetary carrier of the first planetary gear mechanism to conduct the drive force between the drive force input shaft and the planetary carrier of the first planetary gear mechanism;
    one of a sun gear and a ring gear of the first planetary gear mechanism is connected to the rotatable shaft of the first motor generator to conduct a drive force between the one of the sun gear and the ring gear of the first planetary gear mechanism and the rotatable shaft of the first motor generator;
    the other one of the sun gear and the ring gear of the first planetary gear mechanism is connected to the drive force output shaft to conduct a drive force between the other one of the sun gear and the ring gear of the first planetary gear mechanism and the drive force output shaft;
    one of a sun gear and a ring gear of the second planetary gear mechanism is connected to one of the drive force input shaft and the rotatable shaft of the first motor generator to conduct a drive force between the one of the sun gear and the ring gear of the second planetary gear mechanism and the one of the drive force input shaft and the rotatable shaft of the first motor generator;
    the other one of the sun gear and the ring gear of the second planetary gear mechanism is connected to the rotatable shaft of the second motor generator to conduct a drive force between the other one of the sun gear and the ring gear of the second planetary gear mechanism and the rotatable shaft of the second motor generator; and a planetary carrier of the second planetary gear mechanism is connected to the drive force output shaft to conduct a drive force between the planetary carrier of the second planetary gear mechanism and the drive force output shaft.

3. The drive force output apparatus according to claim 1, wherein:
the first predetermined value is set to be a minimum value of the total input-to-output speed ratio; and
the second predetermined value is set to be a maximum value of the total input-to-output speed ratio.

4. The drive force output apparatus according to claim 1, wherein:
the first predetermined value is set to be a value, which is equal to or larger than 0.3 and is equal to or smaller than 0.5; and
the second predetermined value is set to be a value, which is equal to or larger than 1.8 and is equal to or smaller than 3.0.

5. The drive force output apparatus according to claim 1, wherein:
the first predetermined value is set to be a minimum value of the total input-to-output speed ratio, which is used for city driving of the vehicle; and
the second predetermined value is set to be a maximum value of the total input-to-output speed ratio, which is used for the city driving of the vehicle.

6. The drive force output apparatus according to claim 1, wherein:
the first predetermined value is set to be a minimum value of the total input-to-output speed ratio, which is used for a predetermined drive mode of the vehicle; and
the second predetermined value is set to be a maximum value of the total input-to-output speed ratio, which is used for the predetermined drive mode of the vehicle.

7. The drive force output apparatus according to claim 6, wherein the predetermined drive mode is one of JC08 mode, 10-15 mode, EU mode, LA#4 mode and US06 mode.

8. The drive force output apparatus according to claim 1, wherein:
the second planetary gear mechanism is a compounded planetary gear mechanism, which includes a first planetary gear set and a second planetary gear set;
a planetary carrier of the first planetary gear set is connected to a sun gear of the second planetary gear set to conduct a drive force between the planetary carrier of the first planetary gear set and the sun gear of the second planetary gear set;
a ring gear of the first planetary gear set is connected to a planetary carrier of the second planetary gear set to conduct a drive force between the ring gear of the first planetary gear set and the planetary carrier of the second planetary gear set;
a sun gear of the first planetary gear set is provided as a sun gear of the second planetary gear mechanism;
the ring gear of the first planetary gear set is provided as a planetary carrier of the second planetary gear mechanism; and
a ring gear of the second planetary gear set is provided as a ring gear of the second planetary gear mechanism.

9. The drive force output apparatus according to claim 1, wherein a speed reducing mechanism is placed between the second planetary gear mechanism and the rotatable shaft of the second motor generator.

10. The drive force output apparatus according to claim 1, wherein:
at time of outputting the demanded output from the drive force transmission device to the drive force output shaft by changing a rotational speed of rotation conducted from the drive source, the control means controls one of the first motor generator and the second motor generator to control a rotational speed of the drive source and controls the other one of the first motor generator and the second motor generator to control a torque of the drive force output shaft; and
the control means switches a role of controlling the rotational speed of the drive source and a role of controlling the torque of the drive force output shaft between the first motor generator and the second motor generator according to a driving condition of the vehicle.

11. The drive force output apparatus according to claim 1, wherein at time of outputting the demanded output from the drive force transmission device to the drive force output shaft by converting an electric power of the electric power source into a drive force or at time of storing an electric power into the electric power source by converting a drive force of the drive force output shaft into an electric power, the control means controls a torque of the drive force output shaft by generating a torque of the first motor generator and a torque of the second motor generator at a ratio according to the planetary ratio of the second planetary gear mechanism or controls one of the first motor generator and the second motor generator to limit application of a torque to the drive source and controls the other one of the first motor generator and the second motor generator to control a torque of the drive force output shaft.

12. The drive force output apparatus according to claim 1, wherein:
at time of outputting the demanded output from the drive force transmission device to the drive force output shaft by changing a rotational speed of rotation conducted from the drive source and converting an electric power of the electric power source into a drive force, the control means controls one of the first motor generator and the second motor generator to control a rotational speed of the drive source and controls the other one of the first motor generator and the second motor generator to control a torque of the drive force output shaft; and
the control means switches a role of controlling the rotational speed of the drive source and a role of controlling the torque of the drive force output shaft between the first motor generator and the second motor generator according to a driving condition of the vehicle.

13. The drive force output apparatus according to claim 1, wherein at time of starting or stopping the drive source, the control means controls one of the first motor generator and the second motor generator to control a torque of the drive force output shaft and controls the other one of the first motor generator and the second motor generator to control a torque applied to the drive source.

14. A vehicle comprising the drive force output apparatus of claim 1.

* * * * *